(12) United States Patent
Rastegar et al.

(10) Patent No.: US 10,132,393 B2
(45) Date of Patent: *Nov. 20, 2018

(54) MECHANICAL STEPPER MOTORS FOR GUIDED MUNITIONS AND INDUSTRIAL MACHINERY

(71) Applicants: Jahangir S Rastegar, Stony Brook, NY (US); Jacques Fischer, Sound Beach, NY (US)

(72) Inventors: Jahangir S Rastegar, Stony Brook, NY (US); Jacques Fischer, Sound Beach, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 75 days.

This patent is subject to a terminal disclaimer.

(21) Appl. No.: 15/152,514

(22) Filed: May 11, 2016

(65) Prior Publication Data

US 2017/0023112 A1    Jan. 26, 2017

Related U.S. Application Data

(60) Continuation of application No. 13/684,547, filed on Nov. 25, 2012, now Pat. No. 9,341,453, which is a
(Continued)

(51) Int. Cl.
| | |
|---|---|
| *F16H 25/02* | (2006.01) |
| *F42B 10/60* | (2006.01) |
| *F16H 21/44* | (2006.01) |
| *F42B 3/00* | (2006.01) |
| *F42B 10/14* | (2006.01) |
| *F42B 10/64* | (2006.01) |
| *F42B 15/01* | (2006.01) |

(52) U.S. Cl.
CPC ............. *F16H 25/02* (2013.01); *F16H 21/44* (2013.01); *F42B 3/006* (2013.01); *F42B 10/14* (2013.01); *F42B 10/60* (2013.01); *F42B 10/64* (2013.01); *F42B 15/01* (2013.01); *Y10T 74/18992* (2015.01)

(58) Field of Classification Search
CPC .......... F16H 25/02; F42B 10/60; F15B 15/19; B25D 9/18
See application file for complete search history.

(56) References Cited

U.S. PATENT DOCUMENTS 3,603,259 A * 9/1971 Webb .................... F42C 15/184
102/235
3,885,451 A * 5/1975 Hamon .................. F15B 21/00
102/357
(Continued)

*Primary Examiner* — Michael H Wang

(57) ABSTRACT

A projectile including: a body having an internal space; and a mechanical stepper motor disposed in the body, the mechanical stepper motor including: a shuttle having one of a plurality of pockets and movable pins offset from each other with a first spacing; a body portion having the other of the plurality of pockets and movable pins offset from each other with a second spacing, where the first spacing is different from the second spacing; and actuation means for engaging at least one of the movable pins into a corresponding pocket to step one of the shuttle and body portion a predetermined linear and/or rotary displacement; wherein the mechanical stepper motor outputs the predetermined linear and/or rotary displacement to an actuated device operatively connected to the shuttle.

22 Claims, 16 Drawing Sheets

Related U.S. Application Data continuation-in-part of application No. 13/360,747, filed on Jan. 29, 2012, now Pat. No. 8,513,582, which is a division of application No. 12/217,605, filed on Jul. 7, 2008, now Pat. No. 8,110,785.

(60) Provisional application No. 60/958,947, filed on Jul. 10, 2007.

(56) References Cited

U.S. PATENT DOCUMENTS

| | | | | |
|---|---|---|---|---|
| 5,806,791 | A * | 9/1998 | Hatalsky | F02K 9/805 244/3.24 |
| 6,827,310 | B1 * | 12/2004 | Whitham | B64C 9/02 244/3.24 |
| 7,661,364 | B2 * | 2/2010 | Zinell | F42C 15/26 102/222 |
| 8,110,785 | B2 * | 2/2012 | Rastegar | F16H 25/02 244/3.24 |
| 8,193,754 | B2 * | 6/2012 | Rastegar | F16H 25/02 102/261 |
| 8,921,749 | B1 * | 12/2014 | Scott | F42B 10/14 244/3.1 |
| 2010/0206195 | A1 * | 8/2010 | Rastegar | F42B 10/661 102/377 |
| 2014/0260722 | A1 * | 9/2014 | Kopp | F16H 21/44 74/68 |
| 2015/0345909 | A1 * | 12/2015 | Morris | F42B 10/62 244/3.11 |

* cited by examiner

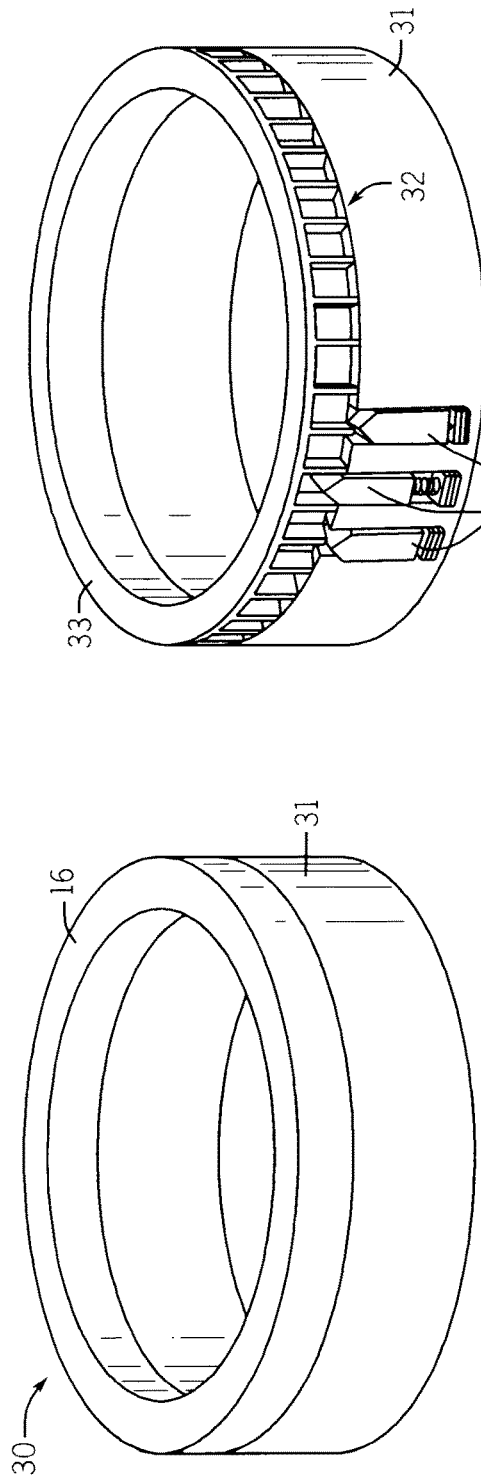
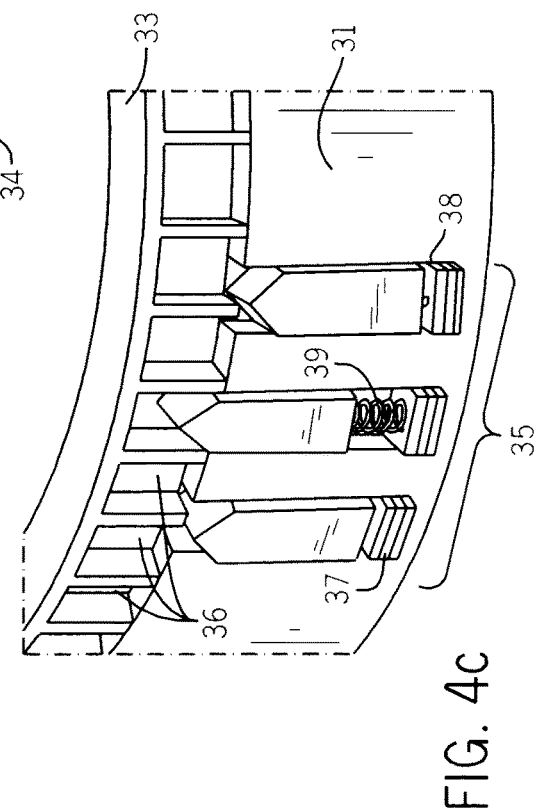
FIG. 4a
FIG. 4b
FIG. 4c

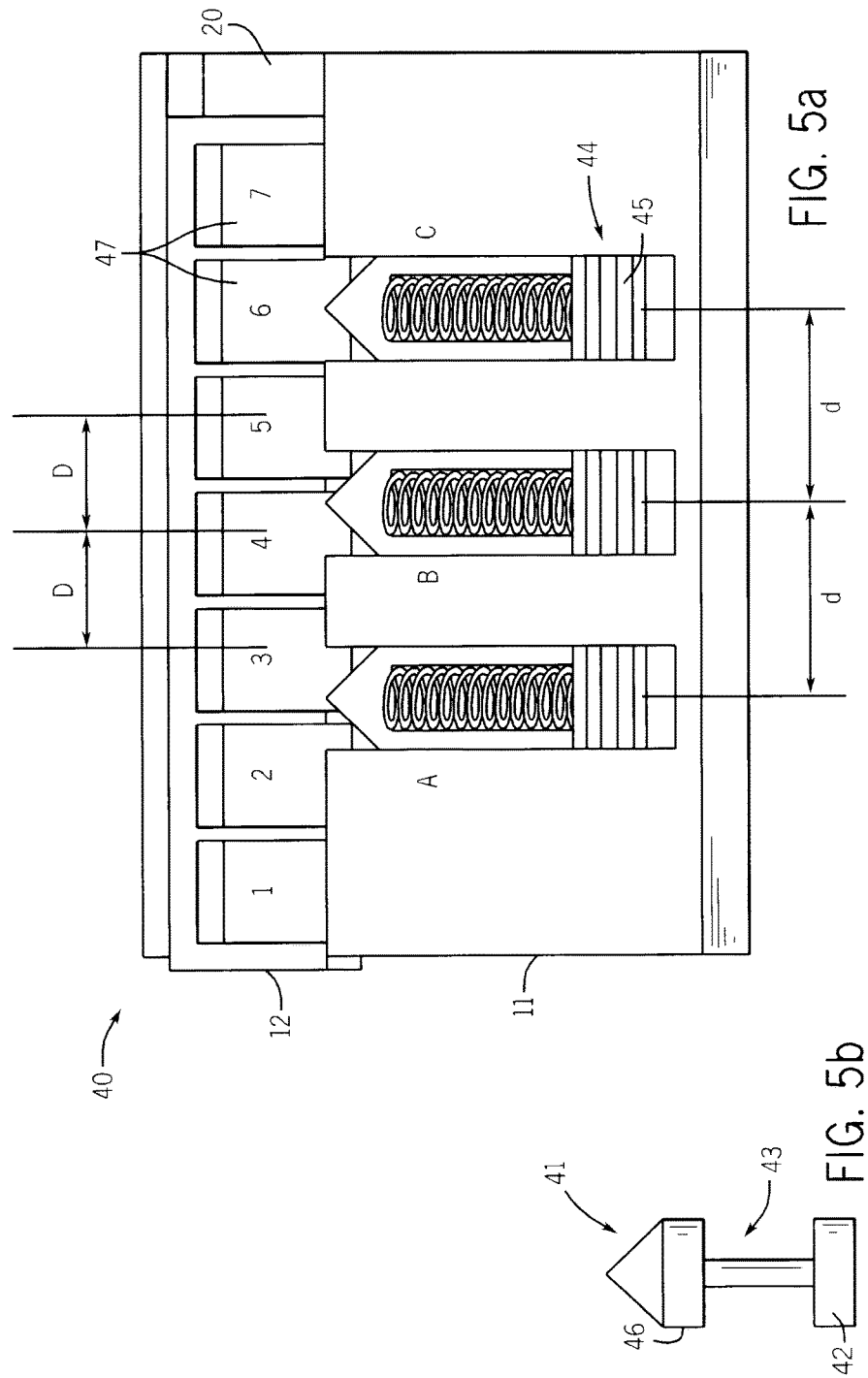

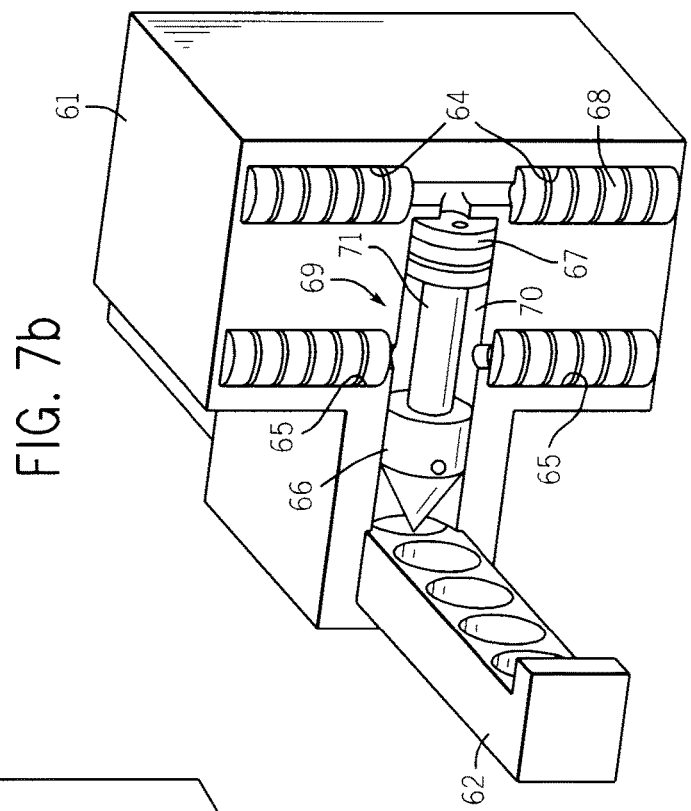
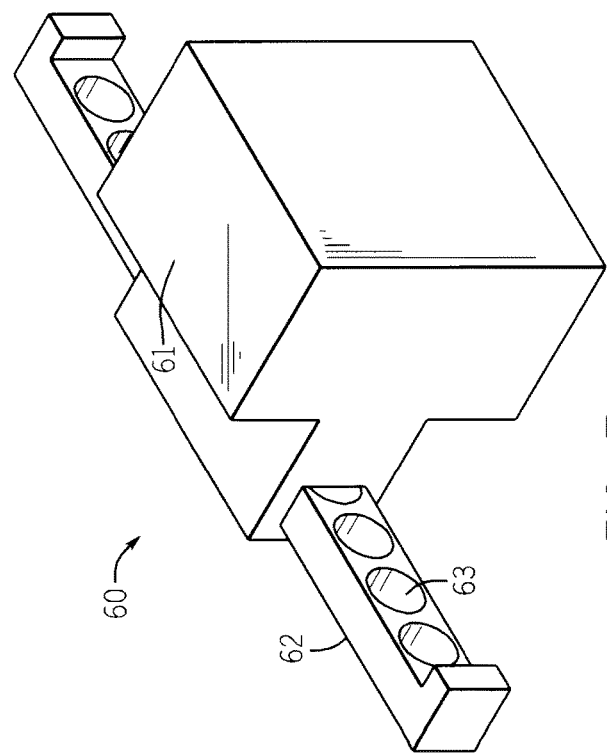
FIG. 7b
FIG. 7a

MECHANICAL STEPPER MOTORS FOR GUIDED MUNITIONS AND INDUSTRIAL MACHINERY

CROSS-REFERENCE TO RELATED APPLICATION

This application is Continuation application of U.S. application Ser. No. 13/684,547, filed on Nov. 25, 2012 (now U.S. Pat. No. 9,341,453), which is a Continuation-In-Part application of U.S. application Ser. No. 13/360,747 (now U.S. Patent Application Publication No. 2012/0241551), which is a Divisional application of application Ser. No. 12/217,605 filed on Jul. 7, 2008 (now U.S. Pat. No. 8,193,754), which claims benefit to U.S. Provisional Application 60/958,947 filed Jul. 10, 2007, the entire contents of each of which are incorporated herein by reference.

BACKGROUND

1. Field

The present invention relates generally to actuators, and more particularly to mechanical stepper motor like actuators. In particular, the present invention relates to mechanical stepper motors with multiple step sizes.

2. Prior Art

Since the introduction of 155 mm guided artillery projectiles in the 1980's, numerous methods and devices have been developed for the guidance and control of subsonic and supersonic gun launched projectiles. The majority of these devices have been developed based on missile and aircraft technologies, which are in many cases difficult or impractical to implement on gun-fired projectiles and mortars. This is particularly true in the case of actuation devices, where electric motors of various designs have dominated the guidance and control of most guided weaponry.

In almost all guided weaponry, such as rockets, actuation devices and batteries used to power the same, occupy a considerable amount of the weaponry's internal volume. In recent years, alternative methods of actuation for flight trajectory correction have been explored, some using smart (active) materials such as piezoelectric ceramics, active polymers, electrostrictive materials, magnetostrictive materials or shape memory alloys, and others using various devices developed based on microelectromechanical (MEMS) and fluidics technologies.

In general, the available smart (active) materials such as piezoelectric ceramics, electrostrictive materials and magnetostrictive materials need to increase their strain capability by at least an order of magnitude in order to become potential candidates for actuator applications for guidance and control, particularly for gun-fired munitions and mortars. In addition, even if the strain rate problems of currently available active materials are solved, their application to gun-fired projectiles and mortars will be very limited due to their very high electrical energy requirements and the volume of the required electrical and electronics gear. Shape memory alloys have good strain characteristics but their dynamic response characteristics (bandwidth) and constitutive behaviour need significant improvement before becoming a viable candidate for actuation devices in general and for munitions in particular.

The currently available and the recently developed methods and devices or those known to be under development for guidance and control of airborne vehicles such as missiles, have not been shown to be suitable for gun-fired projectiles and mortars. In fact, none have been successfully demonstrated for gun-fired guided munitions, including gun-fired and mortar rounds. This has generally been the case since almost all the available guidance and control devices and methodologies suffer from one or more of the following major shortcomings for application in gun-fired projectiles and mortars:

1. Limited control authority (generated force or torque) and high speed actuation capability (dynamic response characteristics or "bandwidth"), considering the dynamics characteristics of gun-fired projectiles and mortars.
2. Reliance on battery-based power for actuation in most available technologies and the requirement of a considerable amount of electrical power for their operation.
3. The relatively large volume requirement for the actuators, batteries and their power electronics.
4. The high cost of the existing technologies, which results in very high-cost rounds, thereby making them impractical for large-scale fielding.
5. Survivability problems of many of the existing devices at high-g firing accelerations and reliability of operation post firing, particularly at very high setback accelerations of over 60,000 Gs.
6. Relative technical complexities involved in their implementation in gun-fired projectiles and mortars.

A need therefore exists for actuation technologies that address these restrictions in a manner that leaves sufficient volume onboard munitions for sensors, guidance and control and communications electronics and fuzing as well as the explosive payload to satisfy lethality requirements.

Such actuation devices must consider the relatively short flight duration for many of the gun-fired projectiles and mortar rounds, which leaves a very short time period within which trajectory correction has to be executed. Such actuation devices must also consider problems related to hardening components for survivability at high firing accelerations and the harsh environment of firing. Reliability is also of much concern since the rounds need to have a shelf life of up to 20 years and could generally be stored at temperatures in the range of −65 to 165 degrees F.

In addition, for years, munitions developers have struggled with placement of components, such as sensors, processors, actuation devices, communications elements and the like within a munitions housing and providing physical interconnections between these components. This task has become even more prohibitive considering the current requirements of making gun-fired munitions and mortars smarter and capable of being guided to their stationary and moving targets, therefore requiring high power consuming and relatively large electrical motors and batteries. It is, therefore, important for all guidance and control actuation devices, their electronics and power sources not to significantly add to the existing problems of integration into the limited projectile volume.

In numerous munitions and other similar applications, the mechanical stepper motor type actuator is required to provide a limited number of linear or rotary or the like motion steps. For example, when used to actuate fins or canards or the like on guided munitions, a limited number of fin or canard positioning, for example five fin or canard positioning, is generally sufficient for proper operation of the guided munitions guidance and control. For example if canards can be rotated in either direction in two steps of up to 10-15 degrees and up to 20-30 degrees, the munitions guidance and control operation can be successfully executed.

In addition, in many machines, actuation devices such as the present mechanical stepper motor type actuation devices are desired to provide more than one and preferably "courser" and "finer" step sizes.

It is appreciated by those skilled in the art that linear (rotary) actuators are generally used to apply linear (rotary) motion, i.e., with minimal applied force (torque), or a combination of linear (rotary) motion and a considerable amount of force (torque). When the level of applied force (torque) to the shuttle is negligible, then a simple friction pad or the like may suffice to ensure that the shuttle would not undergo unwanted motion as an actuating pin is being inserted into a receiving pocket of the actuator shuttle or while an actuated actuating pin is being withdrawn from a shuttle pocket. When the level of applied force (torque) to the shuttle is significant, then unwanted shuttle motion must be prevented while an actuating pin is being withdrawn and the next actuating pin tip has not yet made contact with the corresponding shuttle pocket surface.

A need therefore exists for linear as well as rotary mechanical stepper motor type actuator designs for munitions and similar applications in which a limited number of motion steps are required for proper operation (in the case of munitions the proper operation of the guidance and control function) of the device. It is appreciated that by limiting the number of actuation steps in a mechanical stepper motor type actuation device, the actuation device can be simpler in design and be made to occupy a smaller volume.

A need therefore also exists for linear as well as rotary mechanical stepper motor type actuation devices that are capable of applying controlled force rather than motion steps to the actuated system.

A need therefore also exists for preventing the shuttles of linear as well as rotary mechanical stepper motor type actuation devices from undergoing unwanted motion due to the applied external forces/torques and the like as the actuating pins are advancing the shuttle in the desired direction by their sequential actuation.

SUMMARY

Accordingly, a method is provided for stepping a first member relative to a second member associated with a projectile. The method comprising: providing one of the first and second members with one of a plurality of pockets and movable pins offset from each other with a first spacing; providing the other of the first and second members with the other of the plurality of pockets and movable pins offset from each other with a second spacing, where the first spacing is different from the second spacing; and engaging at least one of the movable pins into a corresponding pocket to step one of the first and second members a predetermined linear and/or rotary displacement; wherein the engaging comprises sequentially engaging two of the plurality of movable pins in their corresponding pockets, such that the relative movement between the first and second members is moved two steps from a reference position.

Also provided is a method for stepping a first member relative to a second member associated with a projectile, where the method comprises: providing one of the first and second members with one of a plurality of pockets and more than three movable pins offset from each other with a first spacing; providing the other of the first and second members with the other of the plurality of pockets and more than three movable pins offset from each other with a second spacing, where the first spacing is different from the second spacing; and engaging at least one of the movable pins into a corresponding pocket to step one of the first and second members a predetermined linear and/or rotary displacement; wherein the engaging comprises selectively varying a step size between the first and second member.

Still further provided is a projectile comprising: a body having an internal space; and a mechanical stepper motor disposed in the body, the mechanical stepper motor comprising: a shuttle having one of a plurality of pockets and movable pins offset from each other with a first spacing; a body portion having the other of the plurality of pockets and movable pins offset from each other with a second spacing, where the first spacing is different from the first spacing; and actuation means for engaging at least one of the movable pins into a corresponding pocket to step one of the shuttle and body portion a predetermined linear and/or rotary displacement.

The mechanical stepper motor can output the predetermined linear and/or rotary displacement to an actuated device operatively connected to the shuttle.

The mechanical stepper motor can apply one of a force or torque to an actuated device operatively connected to the shuttle. The projectile can further comprise an elastic element connected between the shuttle and the actuated device to apply the one of force or torque to the actuated device.

The projectile can further comprise locking means for locking a position of one of the shuttle and body relative to the other. The locking means can comprise means for maintaining one or more of the movable pins in a corresponding pocket after activation thereof. The means for maintaining one or more of the movable pins in a corresponding pocket after activation thereof can further comprise means for removing the one or more of the movable pins from the corresponding pocket prior to a subsequent activation of another of the movable pins.

The locking means can comprise one or more friction pads normally biased against a surface of the shuttle.

The locking means can comprise one or more braking pads selectively biased against a surface of the shuttle by an actuator. The projectile can further comprise a biasing member for further normally biasing the one or more braking pads against the surface of the shuttle.

The activation of the movable pins can disengage the locking means upon movement of the movable pins into a corresponding pocket and can engage the locking means upon withdrawal of the movable pins from the corresponding pocket.

The one or more of the movable pins and pockets can have a profile to vary one of a force, torque or displacement profile during activation of the movable pin into a corresponding pocket.

Still further yet provided is a mechanical stepper motor comprising: a shuttle having one of a plurality of pockets and movable pins offset from each other with a first spacing; a body portion having the other of the plurality of pockets and movable pins offset from each other with a second spacing, where the first spacing is different from the first spacing; and actuation means for engaging at least one of the movable pins into a corresponding pocket to step one of the shuttle and body portion a predetermined linear and/or rotary displacement.

The mechanical stepper motor can output the predetermined linear and/or rotary displacement to an actuated device operatively connected to the shuttle.

The mechanical stepper motor can apply one of a force or torque to an actuated device operatively connected to the shuttle. The mechanical stepper motor can further comprise an elastic element connected between the shuttle and the actuated device to apply the one of force or torque to the actuated device.

The mechanical stepper motor can further comprising locking means for locking a position of one of the shuttle and body relative to the other.

The locking means can comprise means for maintaining one or more of the movable pins in a corresponding pocket after activation thereof.

The means for maintaining one or more of the movable pins in a corresponding pocket after activation thereof can further comprise means for removing the one or more of the movable pins from the corresponding pocket prior to a subsequent activation of another of the movable pins.

The locking means can comprise one or more friction pads normally biased against a surface of the shuttle.

The locking means can comprise one or more braking pads selectively biased against a surface of the shuttle by an actuator. The mechanical stepper motor can further comprise a biasing member for further normally biasing the one or more braking pads against the surface of the shuttle.

The activation of the movable pins can disengage the locking means upon movement of the movable pins into a corresponding pocket and can engage the locking means upon withdrawal of the movable pins from the corresponding pocket.

The one or more of the movable pins and pockets can have a profile to vary one of a force, torque or displacement profile during activation of the movable pin into a corresponding pocket.

BRIEF DESCRIPTION OF THE DRAWINGS

These and other features, aspects, and advantages of the apparatus of the present invention will become better understood with regard to the following description, appended claims, and accompanying drawings where:

FIG. 4a illustrates an overall view of a rotary mechanical stepper motor like actuator.

FIG. 4b illustrates a cutaway view of the rotary mechanical stepper motor like actuator of FIG. 4a.

FIG. 4c illustrates a close-up view of the cutaway view of the rotary mechanical stepper motor like actuator of FIG. 4b.

FIG. 5a illustrates a frontal cutaway view of the linear mechanical stepper motor like actuator of FIG. 1-3 with double acting actuating pins.

FIG. 5b illustrates a variation of a piston for use with the linear mechanical stepper motor of FIG. 5a shown without the spring.

FIG. 7a illustrates an overall view of a linear mechanical stepper motor like actuator with double acting actuating pins and at least one laterally positioned detonation charges.

FIG. 7b illustrates a cutaway view of the linear mechanical stepper motor like actuator of with double acting actuating pins and at least one laterally positioned detonation charges of FIG. 7a.

DETAILED DESCRIPTION OF THE PREFERRED EMBODIMENT

Figure 1B:
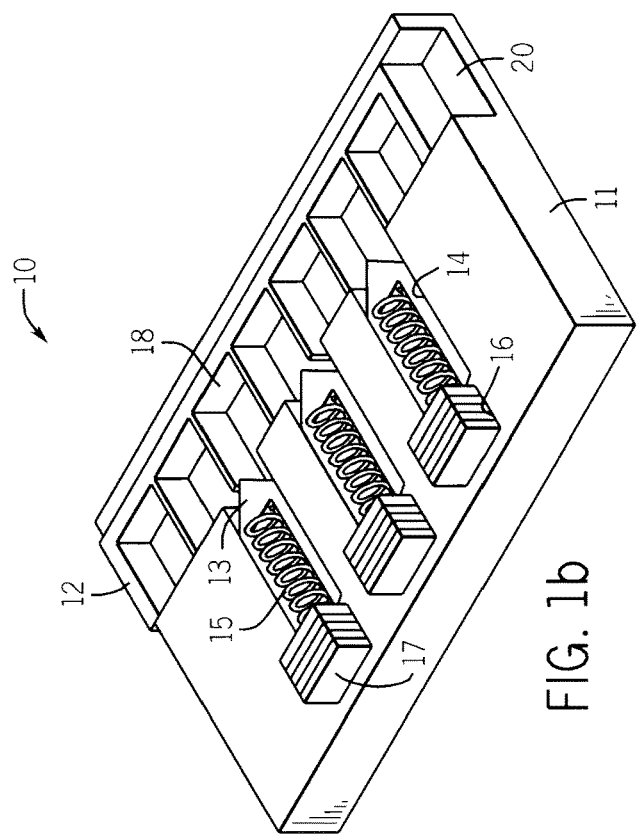
FIG. 1b illustrates a cutaway view of the linear mechanical stepper motor like actuator of FIG. 1a showing its internal components.

Although the present invention is applicable to numerous types of actuators, it is particularly useful in the environment of actuators for gun-fired projectiles, mortars and missiles. Therefore, without limiting the applicability of the present invention to actuators for gun-fired projectiles, mortars and missiles, it will be described in such an environment. Further, the disclosed actuators can also be used anywhere a stepper motor (rotary and/or linear) can be used, such as in manufacturing and inspection processes and robotics. A particular useful application for the disclosed mechanical stepper motors is in linear and rotary indexing tables.

The disclosed "mechanical stepper motor" like actuation devices can be designed to provide very high force (torque) compared to similar sized electrical linear (rotary) motors. The actuators can also be designed with very high dynamic response characteristics. The high force (torque) and high dynamic response characteristics of the disclosed "mechanical stepper motor" like actuation devices make them particularly suitable for gun-fired projectile, mortar and missile guidance and control applications. The disclosed actuation technology can be used to construct linear as well as rotary actuation devices, particularly those for actuating flight control surfaces such as fins and canards in gun-fired projectiles, mortars and missiles. In fact, the disclosed actuation technology can also be used to construct actuation devices powering devices with arbitrary curved motion paths, including circular arcs.

The actuators disclosed herein require minimal volume since they can be powered by pressurized gas, such as the detonation of embedded charges that could provide high internal pressures and thereby high actuating forces/torques and high dynamic response, particularly larger than those possible by other actuation devices, such as electrical motors. With the disclosed actuation technology, since solid charges have energy densities that are orders of magnitude higher than the best available batteries, a very significant total volume savings is also achieved by the elimination of batteries that are required to power electrically powered actuation devices.

It is also noted that the disclosed "mechanical stepper motor" like actuation devices require minimal electrical power to operate since they are based on detonation of embedded charges and that charges can be detonated using as little as 3-5 mJ of electrical energy. It is also noted that by significantly reducing the amount of electrical energy that is needed for actuation purposes, it may become possible to utilize energy harvesting power sources for their operation, thereby eliminating the need for chemical batteries in certain applications.

The disclosed "mechanical stepper motor" like actuation devices are capable of being embedded into the structure of the projectile, mostly as load bearing structural components, thereby occupying minimal projectile volume. In addition, the actuation devices and their related components are better protected against high firing acceleration loads, vibration, impact loading, repeated loading and acceleration and deceleration cycles that can be experienced during transportation and loading operations.

Some of the features of the disclosed "mechanical stepper motor" like actuation devices for gun-fired projectiles, mortars and missiles and the like include:

1. The disclosed actuators can have very high control authority and very high dynamic response characteristics since they are based on detonations of charges and utilization of the generated high detonation pressures to drive the actuation devices. For example, such a linear actuator operating at a detonation pressure of around 5,000 psi and with a pressure surface of 0.5 square inches would readily provide a force of around 10,000 N. A rotary actuator with a similar sized pressure area with an effective diameter of 2 inches and operating at 5,000 psi could readily produce a torque of around 250 N-m. In addition, reliable detonation within time periods of 5-10 msec and even significantly lower with nanoenergetic materials based ignition can be readily achievable. This allows motion steps at a rate of at least 100-200 Hz (cycles per second). For these reasons, the proposed actuators are particularly well-suited for guidance and control of precision gun-fired projectiles, mortars and missiles.
2. The disclosed actuators can require very low electrical power for operation. A large amount of projectile volume is therefore saved by the elimination of large battery-based power sources that are required for electrical actuation devices such as electrical motors and solenoid type actuation devices. Furthermore, by significantly reducing the power requirement, it is possible to use onboard energy harvesting power sources and thereby totally eliminating the need for onboard chemical batteries. As a result, safety and shelf life of the projectile is also significantly increased.
3. The disclosed actuators can be significantly lighter than electrical actuation devices that are commonly used for guidance and control and occupy very small useful volume of the projectile. This is the case since the disclosed actuators are high torque/force, fast acting (have high dynamic response characteristics) and may be integrated into the structure of the projectile as load bearing structures. The latter characteristic is also advantageous from the guidance and control point of view since the actuation force (torque) is applied directly to the round structure without intermediate components. Almost all such intermediate coupling mechanisms also introduce flexibility between the control force (torque) and the projectile structure, thereby reducing the performance of the feedback control system.
4. The disclosed rotary actuators can be designed in an arc form to provide a desired range of angular rotation. The actuators may also be designed to provide motion along arbitrarily varying curved paths without any intermediate cams or other similar components.
5. The disclosed actuators can operate as stepper motors, but the actuators have the added advantage of being mechanical, herein referred to as "mechanical stepper motors", and capable of being locked following each motion step, and would therefore require no sensors to close a feedback loop for proper positioning.
6. Due to the capability of the disclosed actuators to be integrated into the structure of the projectile and their unique design, they can be readily hardened to survive very high-g firing loads and very harsh environment of firing. The disclosed actuators will therefore provide highly reliable devices for use in gun-fired projectiles, mortars and missiles.
7. The disclosed actuators can be built as modular units and can thereby form the basis for developing a common actuator solution for almost all gun-fired projectiles, mortars and missiles and the like for actuating control surfaces and the like.
8. The disclosed actuators can be very simple in design, and can be constructed with very few moving parts and no ball bearings or other similar joints, thereby making them highly reliable even following very long storage times of over 20 years.
9. The disclosed actuators are scalable to almost any small or large force/torque requirements.
10. The disclosed actuators can be designed to conform to almost any geometrical shape of the structure of the projectile and the available space within the projectile housing.
11. The disclosed actuators are capable of withstanding high vibration, impact and repeated loads due to their design integration into the structure of the projectile.

12. The disclosed actuators can be very simple in design and utilize mostly existing manufacturing processes and components. As a result, they can provide the means to develop highly effective but low cost guidance and control systems for guided gun-fired projectiles, mortars and missiles.
13. The disclosed actuators can provide cost effective means to significantly increase munitions precision and thereby the probability of a hit.
14. The disclosed actuators can be used in both subsonic and supersonic projectiles.

The disclosed actuators have a wide range of military and commercial applications, particularly when powered pneumatically and even hydraulically, as mechanical stepper motors with position locking capability.

The disclosed "mechanical stepper motor" type actuators and their basic operation and methods of their design and manufacture and integration into the structure of projectiles will now be described in detail by linear mechanical stepper motor design shown in FIGS. 1a and 1b. It is shown that the disclosed actuators would provide very cost effective and have high actuation force/torque and dynamic response characteristics, while occupying very small useful projectile volume and requiring very low electrical power. It is also shown that the disclosed actuators can be capable of being readily scaled to the desired application. The disclosed actuator concepts could be built as modular units and could form the basis for developing a common actuator solution for any gun-fired projectile, mortar or missile.

In addition, different methods of powering and driving the disclosed actuation devices are described.

Furthermore, methods of obtaining multistep actuation devices with one or more coarse and fine step sizes to achieve the desired speed and positioning precision are described.

Figure 1A:
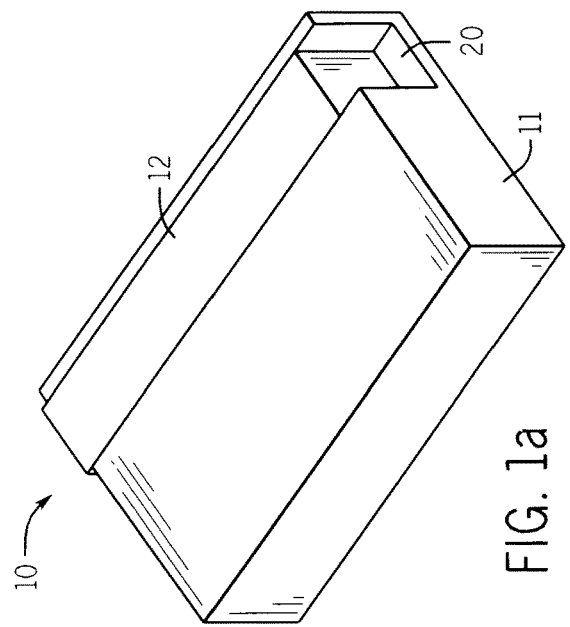
FIG. 1a illustrates an overall view of a linear mechanical stepper motor type linear actuator.

An overall view of the basic linear mechanical stepper motor type linear actuator 10 is shown in FIG. 1a. The cutaway view of the actuator 10 showing its internal components is shown in FIG. 1b. The linear mechanical stepper motor 10, FIG. 1a, hereinafter also referred to simply as a linear motor, a linear actuator or a linear stepper motor, consists of two major parts, a body 11 (the stationary part of the linear motor) and a shuttle 12 (the linearly translating part of the linear motor). In the munitions applications, the body of the linear motor can be an integral part of the projectile structure as a load-bearing structure of the projectile, thereby allowing the linear motor to occupy minimal internal volume.

The cutaway view of the linear motor 10 is shown in FIG. 1b. The shuttle 12 is seen to be provided with equally spaced pockets 18 facing downward towards the base of the linear motor 10. The shuttle 18 is provided with a guide 20 for its linear translation inside the linear motor body 11. Within the linear motor body 11 are also provided with at least three equally spaced detonation activated actuator "pins" 13. The actuator pins 13 are provided with matching guides 14 in the actuator body 11 within which they could translate. In the design shown in FIGS. 1a and 1b, the actuator pins 13 are biased downward by return tensile springs 15 as shown in FIG. 1b, positioning them normally in a disengaged position with respect to the shuttle pockets 18 as seen in FIG. 1b.

In the design shown in FIGS. 1a and 1b, a number of layers of denotation charges 17 are provided in a space 16 under the actuator pins 13. The layers of detonation charges 17 may be detonated electronically (not shown) in a sequential manner by the actuator controller unit (not shown). The detonation and timing of detonation charges and the electronics therefore are well known in the art. The basic operation of the high force/torque and high dynamic response mechanical linear stepper motor 10 is described below.

Figure 2:
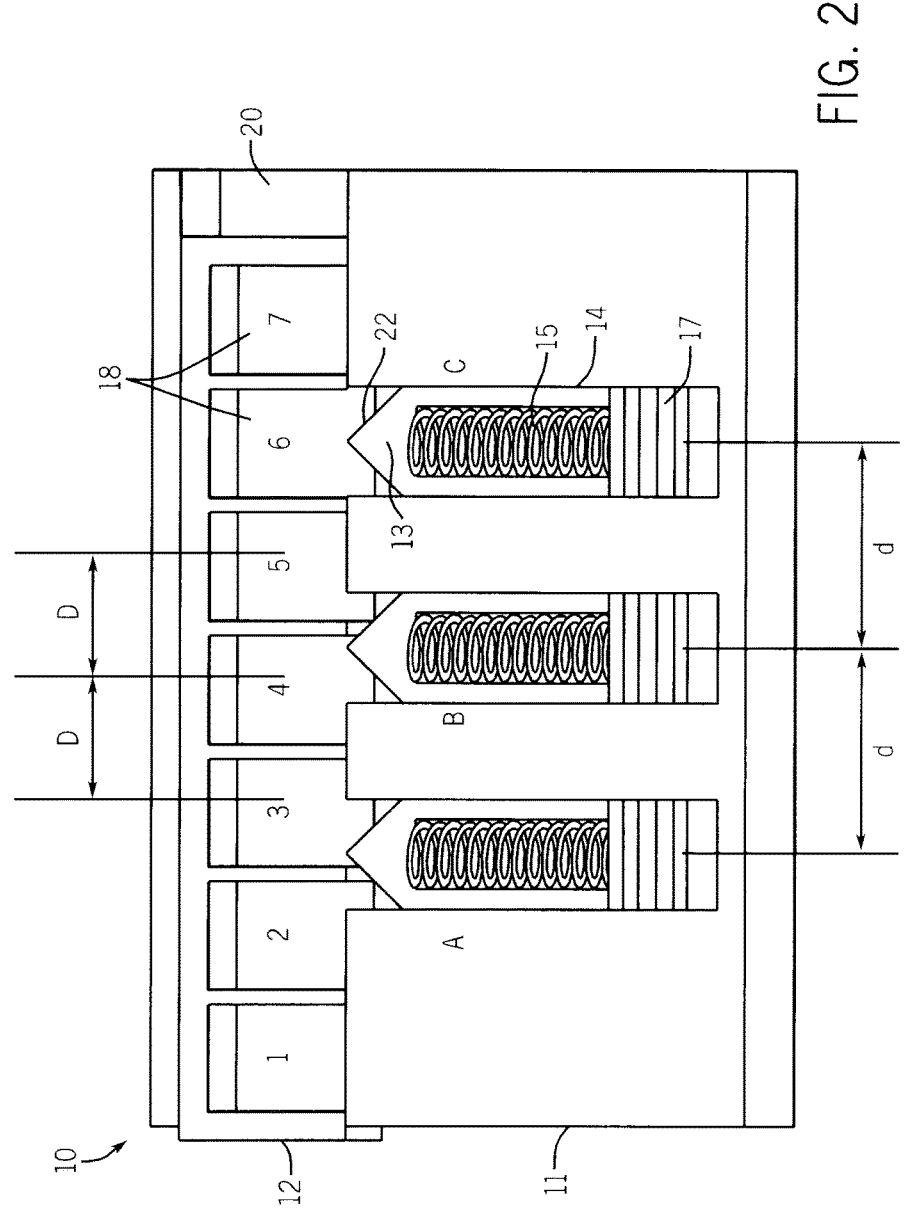
FIG. 2 illustrates a frontal view of the linear mechanical stepper motor like actuator of FIGS. 1a and 1b.

The operation of the disclosed class of mechanical linear stepper motor like actuator 10 is best described by the schematic of FIG. 2, which is in effect the frontal cutaway view of the basic components of the linear actuator 10 shown in FIGS. 1a and 1b. The operation of this class of stepper motor like actuators is based on the principles of operation of simple Verniers. A Vernier (also called a Vernier scale) is "A small, movable auxiliary graduated scale attached parallel to a main graduated scale, calibrated to indicate fractional parts of the subdivisions of the larger scale, and used on certain precision instruments to increase accuracy in measurement" (The Free Dictionary by Farlex, Inc., 1051 County Line Road Suite 100, Huntingdon Valley, Pa. 19006).

In the linear mechanical stepper (motor) actuator 10, the shuttle 12 of the actuator is provided with pockets 18 (numbered 1 through 7 in FIG. 2) that are positioned a distance D apart as is shown in FIG. 2. Three actuating pins 13 (indicated with letters A, B and C) are sized to closely fit the shuttle pockets 18, can translate in the guides 14 provided in the actuator body 11, and are positioned a distance d apart where d>D. Let $$d-D=\delta \quad (1)$$

Figure 3A:
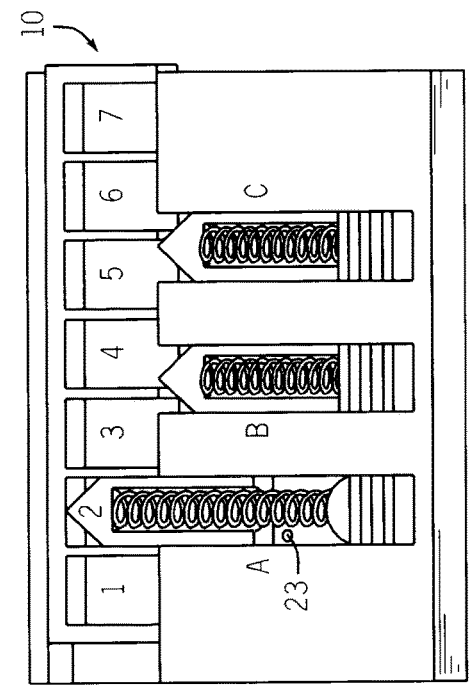
FIG. 3a illustrates a frontal view of the linear mechanical stepper motor like actuator of FIGS. 1a and 1b with the pin C actuated to move the shuttle one step to the right.
Figure 3B:
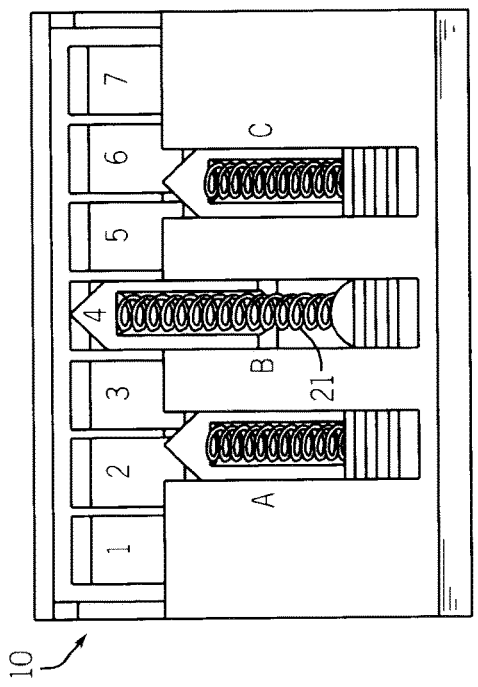
FIG. 3b illustrates a frontal view of the linear mechanical stepper motor like actuator of FIGS. 1a and 1b with the pin B actuated to move the shuttle one more step to the right.
Figure 3C:
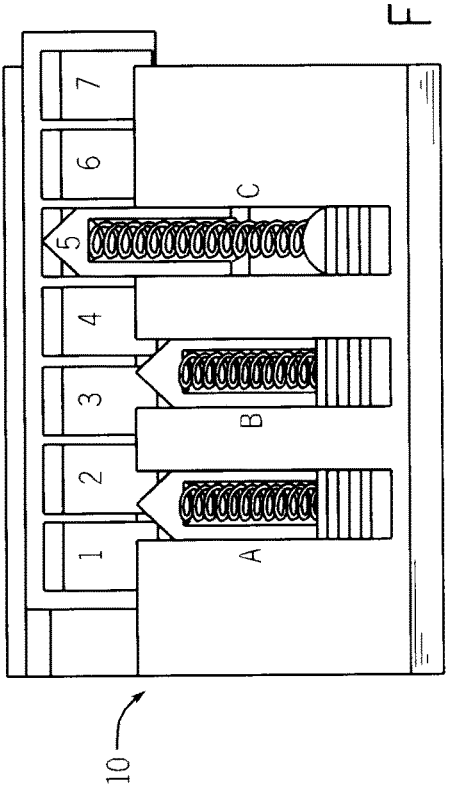
FIG. 3c illustrates a frontal view of the linear mechanical stepper motor like actuator of FIGS. 1a and 1b with the pin A actuated to move the shuttle one more step to the right.

Now consider the situation in which the actuator pin C has been pushed into the pocket 6, thereby lining up the shuttle 12 above the actuator body 11, followed by the withdrawal of the pin C, as can be seen in FIG. 2. Now by pushing the actuator pin B up into the pocket 4 as shown in FIG. 3a, the pocket 4 is then lined up with the actuator pin B, thereby advancing the actuator shuttle 12 one step to the right. To advance the actuator shuttle 12 one more step to the right, the actuator pin A is pushed up into the pocket 2 of the actuator shuttle 12 as shown in FIG. 3b and then retracted. At this point, the actuator pin C may be pushed into the actuator pocket 5 as shown in FIG. 3c and then retracted, thereby moving the actuator shuttle 12 one more step to the right. At this point, the shuttle 12 pockets 18 are in a similar position over the actuator pins as they were initially as shown in FIG. 2, with the difference of having been advanced one full pocket distance D to the right. By repeating the above sequence of pin A, B and C actuation, the actuator shuttle 12 can be moved further steps to the right. The pins A, B and C are pushed into the pockets by detonation of one or more of the detonation charges 17.

The actuator shuttle 12 may be moved similarly a desired number of steps to the left, starting from any one of the shuttle 12 positions shown in FIG. 2 or 3. For example, starting from the shuttle 12 position shown in FIG. 2, the shuttle is moved one step to the left by actuating the pin A into the pocket 3. The second step to the left is then achieved by actuating the pin B into the pocket 5. The next step to the left is then achieved by actuating the pin C into the pocket 7.

It is noted that in the linear actuator 10, the upward motion of the actuator 10 pins 13 is shown to be achieved by the detonation of one layer of the charges 17 provided in the space 16 under the selected actuator 10 pins 13, followed by the discharge of the pressurized gases in the compartment 21 under each actuator 10 pin 13 and the pulling back of the actuator 10 pin 13 by the provided tensile spring element 15. This may be readily achieved by the provision of exhaust vents (shown for example in FIG. 3b corresponding to only pin B but which would be used for each of the pins) that are positioned such that in their resting position, the pins 13 cover the vent hole(s) 23. Then once actuated, the pins 13 pass the vent hole(s), thereby allowing the generated pressurized gases to substantially escape through the vent hole(s) 23, thereby allowing the tensile return springs to return the pin to its resting position.

It is readily seen that by varying the distance d (FIG. 2) and thereby the difference δ, equation (1), the step size of the present mechanical linear actuator 10 can be varied. In a similar manner, as is expected from the present Vernier-based stepper motor like linear actuator 10, more than three actuation pins 13 and larger or smaller differences δ may be used to achieve almost any stepper motor step size.

In a second embodiment, more than one set of actuation pins 13 can be provided which operate independent of each other and may be positioned in line or parallel to each other, i.e., one set behind the other, to achieve two or more step sizes to, for example, course step and fine step sizes. In such a configuration, a shuttle 12 may be provided corresponding to each set of pins 13 or a single shuttle 12 may be used having two sets of pockets 18 (one corresponding to each of the sets of pins 13).

In addition, for the same body 11 and a shuttle 12 with different pocket distance D, the step size is readily varied within a certain limit indicated by the size of the pin 13 angled tips 22, FIG. 2, which would still allow sequential operation of the pins 13.

Alternatively, a modular actuation pin portion that is shown embedded in the body 11 of the actuator 10, FIGS. 1-3, may be constructed separately and be attached to the actuator body 10 with the same positioning relative to the guide 20 to similarly actuate the shuttle 12. In such a design, by selecting actuator portions with different pin spacing d, the step size of the linear motor is similarly varied.

Alternatively, each actuating pin assembly may be constructed separately and then attached to the actuator 10 body 11 with a desired pin spacing d, to achieve the desired step size for the linear stepper (motor) actuator 10.

Alternatively, it is readily observed that the body 11 of the present mechanical linear stepper (motors) actuators 10 can be an integral part of the structure of the projectile as a load bearing component. As such, one only needs to machine the guide 20 for the aforementioned shuttle 12, position the shuttle 12 in place and attach a modular actuator pin unit in place to complete the assembly of the mechanical components of the actuator into the structure of the projectile.

Alternatively, the guide 20 may be a separate modular component that is attached to the body of the projectile, for example, via fasteners such as screws. The pin assembly or individual pin assemblies may then be attached separately to the body of the projectile to achieve the desired shuttle 12 motion.

It is also appreciated by those skilled in the art that the maximum step size of the disclosed stepper motor like actuators is dependent and limited by the width of the actuating pin 13 tip 22 (base diameter of the pin 13 tip 22 cone if a conical tip 22 is used).

It is also appreciated by those skilled in the art that with any size width of the actuating pin 13 tip 22 (or based diameter of the pin 13 tip 22 cone if a conical tip 22 is used), any desired pin spacing d, thereby any desired step size δ may be achieved, FIG. 2. However, when the width of the actuating pin 13 tip 22 (or based diameter of the pin 13 tip 22 cone if a conical tip 22 is used) is relatively larger and the desired pin spacing d is relatively small such that the pins may overlap each other if are positioned side by side in a single plane, then the pins have to be positioned back and forth enough to clear each other, for example the pin B in FIG. 2 may be positioned in the back (or in the front) (i.e., further in or out of the page) of the pins A and C to allow for larger actuating pin 13 tip 22 to be positioned between the pins A and C. The width of the shuttle 12 must then be appropriately increased to allow for the required number of rows of pockets 18 (in the example two rows of pockets 18) to be provided in the shuttle 12.

It is noted that the above description of the design and operation of the stepper motor like linear actuator (motor) is provided mainly with the objective of describing the method of design and basic principles of operation of the disclosed "mechanical stepper motors". In the following part of the present disclosure, other embodiments of the disclosed "mechanical stepper motors" and their different possible implementations and operational characteristics are described.

Also, more than one row of pockets 18 may be provided on the shuttle 12 with a corresponding set of pins 13 provided for each row. For example, two such rows of pockets 18 can be provided in the shuttle 12 with two sets of pins 13. The width of the actuating pins 13 tip 22 and/or pin spacing d, can be varied between sets of pins/pockets to have a different step size δ for each set of pins. In this way, one of the sets of pins/pockets can be used to step the shuttle in a coarse adjustment and the other set of pins/pockets can be used to step the shuttle in a fine adjustment.

In FIGS. 1-3, the disclosed method of developing mechanical stepper motors is presented for the case of a linear stepper actuator (motor). It is, however, appreciated by those skilled in the art that the disclosed method can be readily used to design rotary mechanical stepper type actuators (motors) with partial or full range of rotations such as the rotary actuator 30 shown in FIGS. 4a-4c. The rotary stepper motor type mechanical actuator 30 is designed to provide full rotary motion. The rotary actuator 30 consists of a circular body 31 with provided circularly positioned guide 32 with circularly shaped shuttle 33 to ride inside the guide 32 as shown in FIGS. 4a-4c.

The overall view of such a rotary mechanical stepper motor (actuator) 30 is shown in FIG. 4a, with a cutaway view shown in FIG. 4b, a close-up view of which is shown in FIG. 4c. As can be observed, in such a configuration, the actuation pins 34 are still positioned inside the body 31, but along a circular arc 35, above which the shuttle 33 pockets 36 are positioned. The upward motion of the actuator 30 pins 34 is shown to be achieved by the detonation of one or more layers of the charges 37 provided in the space 38 under the selected actuator 30 pins 34, followed by the discharge of the pressurized gases and the pulling back of the actuator 30 pins 34 by the provided tensile spring element 39 as was previously described for the linear mechanical stepper motor (actuator) shown in FIGS. 1 and 2. The clockwise and counterclockwise rotation of the shuttle 33 is achieved in an identical manner by the sequential actuation of the actuating pins 34.

It is appreciated by those familiar with the art that the mechanical rotary stepper motor (actuator) shown in FIGS. 3a-3c may be fabricated for either full rotary actuation; as a circular arc to produce a desired (limited) range of angular rotation; or displacing a shuttle along a desired arbitrarily curved path.

It is also appreciated by those familiar with the art that all the aforementioned variations in the construction of the mechanical linear stepper motors (actuators), FIGS. 1-3, can be readily implemented on the above mechanical rotary stepper motors (actuators) shown in FIGS. 4a-4c.

It is noted that in the aforementioned linear and rotary mechanical stepper motor like actuators, the actuating pins 13 and 34, FIG. 1b and FIGS. 4b-4c, respectively, are integrated into (or the actuating pin assemblies are attached to) the body of the actuators. Here, the bodies 11 and 31 of the actuators, FIGS. 1a and 4a, respectively, are attached to the structure of the projectile (i.e., grounded or fixed), while the shuttles 12 and 16, FIGS. 1a and 4a, respectively, are moving relative to the bodies 11 and 31. It is, however, appreciated by those familiar with the art that alternatively, the actuating pins 13 and 34, FIG. 1b and FIGS. 4b-4c, respectively, may be integrated into (or the actuating pin assemblies be attached to) the body of the shuttles 12 and 16, FIGS. 1a and 4a, respectively. The pockets 18 and 36, FIGS. 1b and 4c, respectively, are then provided in the body of the actuators 10 and 30, FIGS. 1 and 4, respectively.

In the above embodiments, the actuators of FIGS. 1 and 4, the actuator pins 13 and 34, FIG. 1b and FIGS. 4b-4c, respectively, are shown to be biased by the provided tensile springs 15 and 39, respectively, to normally stay in their "pulled back" (disengaged from the shuttle) position. The upward motion of the actuator pins 13 and 34 are then achieved by the detonation of one layer of the charges provided under the actuator pins. The pressurized gases in the compartment under each actuator pin that drive the pin upward to engage the shuttle and cause it to move one step to the right or to the left is then discharged, thereby causing the actuator pin to be pulled back by the provided tensile spring element. The discharging of the pressurized gas may be achieved by the provision of exhaust vents 23 that are positioned such that in their resting position, the pins sealingly cover the vent hole(s) 23. Then once actuated, the pins pass the vent hole(s), thereby allowing the generated pressurized gases to substantially escape through the vent hole(s), thereby allowing the tensile return springs to return the pin to its resting position.

This method of venting the pressurized gases is very simple and does not require provision of directional valves of any kind. The resulting actuation system will also be very small and more reliable since it does not require additional components. The system will also not require external power to actively actuate switching valves.

In the above mode of operation, the actuation devices (linear and/or rotary) do not lock the shuttle to the actuator body, i.e., once the shuttle has moved a step to the right or to the left, since the actuating pin is retracted, the shuttle is held in place only by friction forces and by any external forces that tend to keep it in its new position. This would mean that if external forces are acting on the actuator, then the shuttle (rotor) may be pushed away from its new position. The system designer would then have the following two options for minimizing or eliminating the resulting positioning errors.

The first option is to provide an external brake to lock the shuttle to the actuator body. This is what is commonly done with electrical stepper (or other similar type) motors used to move an object to a specified position and keep the object in that position such as electric motors used in positioning stages, robotic arms and the like. This is generally done so that external power would not be required to keep the device in its prescribed position while external forces, including gravitational forces, are acting on the system. The braking of the motor, i.e., locking the device in its prescribed position, would also add to positioning accuracy of the system since external disturbances would not cause the device to be displaced from its prescribed position.

The second option is to use a servo (feedback) control system to continuously tend to move the shuttle closer to its prescribed position as external disturbances cause the shuttle to be displaced away from its prescribed position. Such an option is also commonly used in the art for various electrical and other types of linear and rotary actuation devices. However, when the shuttle (device being driven) is at times to be held in a prescribed position, this option would demand a considerable amount of power to operate. The latter energy that is consumed by the motor (actuator) does not amount to any useful work since in effect it is used to generate reaction forces that could have otherwise been generated by a braking device that would require a relatively small amount of electrical energy to actuate. The locking type actuation devices, if appropriate for the application at hand, are generally preferable since they lead to much simpler guidance and control systems.

The added advantage of the disclosed linear and rotary actuation devices is that they could be readily configured to operate as stepper motors with integral locking mechanisms. This is readily accomplished as follows.

Consider the disclosed linear mechanical stepper motor like actuator 10 shown in FIGS. 1-3. In this embodiment, the actuating pins 13 are biased downward by the tensile springs 15. As a result, following each actuation action, i.e., after an actuating pin 13 is pushed upward into the provided shuttle pocket 18, the return tensile spring 15 pulls the pin back into its rest position once the pressurized gases in the compartment 16 have been substantially vented through the provided venting holes (23) as described previously. The provision of the tensile return springs 15 actually allows the actuating pin 13 to act similar to a single acting pneumatic piston. The disclosed actuation devices 10 and 30, FIGS. 1 and 4, respectively, can however be transformed to stepper motor like actuation devices with integral position locking features with minimal modification. This is accomplished using either one of the following methods:

In the first method, the aforementioned tensile return springs 15 are removed and the actuating pins 13 are provided with the means to operate as a double acting pneumatic piston. In this embodiment 40, the actuating pins shown in FIG. 5a are replaced with actuating pins 41 as shown in FIG. 5b. Such actuating pins 41 can be designed with a piston 42 with a space 43 provided in the piston front as shown in FIG. 5b. In this embodiment, the detonation charges 45 provide the pressure to force the actuating pins 41 up to actuate the shuttle 12 to the right or to the left. No tensile return springs are provided. In addition, no vents are provided to discharge the pressurized gas. The pressurized gas would then keep the shuttle 41 locked to the actuator 40 body 11.

It is noted that as shown in FIGS. 1-3, the straight portion of the actuating pins 13 below their angled tips 22 fits inside the shuttle pocket 18, providing the means to resist further movement of the shuttle 12 relative to the actuator body 11, i.e., locking the shuttle 12 to the actuator body 11. In the embodiment 40 of FIG. 5, the actuating pin 41 is also provided with a straight portion 46 (cylindrical if the pin is cylindrical) so that when actuated, the straight portion 46 fits insider the shuttle pockets 47, thereby locking the shuttle 12 to the actuator body 11. The one actuated pin 41 is then retracted following the detonation of charges in a second pin chamber 44, which would also actuate and open a vent to allow the pressurized gases to escape from the first pin chamber 44, and pressurizing its frontal space 43 to force the first actuating pin 41 down into its rest position. This would effectively provide the means to allow the actuating pins 41 to act as double acting pneumatic cylinders. Such pneumatic valve systems to affect such pressurized gas routing are well known in the art and are not shown in FIGS. 5a and 5b.

In the second method, the tensile return springs 15, FIGS. 1-3, are retained. The pressurized gas vent holes 23 described for the embodiments of FIGS. 1-3 are, however, removed. As previously described, the detonation charges 17 will provide the force to push the actuating pins 13 up to actuate the shuttle 12 to the right or to the left. Since no vents are provided to discharge the pressurized gas, the pressurized gas would keep the shuttle 12 locked to the actuator body 11. The actuated pin 13 is then retracted following the detonation of charges 17 in the chamber 16 of a second actuating pin 13, which would actuate the second actuating pin 13, and which would also actuate and open a vent to allow the pressurized gases to escape from the first actuated pin 13 chamber 16. The tensile return spring 15 will then retract the first actuating pin 13 to its rest position, thereby allowing the second actuating pin 13 to actuate the shuttle 12 to the right or to the left. This would effectively provide the means to allow the actuating pins 13 to act as single acting pneumatic cylinders with spring return mechanisms 15.

The latter embodiment constructed using the above second method can be simpler in design and does not require more complex valves to actuate the former double acting pin version design.

It is appreciated by those skilled in the art that the above shuttle 12 position locking feature (constructed using either one of the aforementioned methods) can be readily extended to rotary actuation devices (such as the one shown in FIG. 4) and even to actuating devices that provide almost any arbitrarily curved motions.

In the embodiments of the FIGS. 1-5, the pressurized gas used to actuate the actuating pins (13, 34 and 41 in FIGS. 1, 4 and 5, respectively) are generated by the detonation of charges that are stacked in the cavity below the actuating pins. In these embodiments, a number of individual charges (17, 37 and 45 in FIGS. 1, 4 and 5, respectively) are packed within the cavity and detonated on command to generate the required pressure within the cavity to actuate the actuating pins. This method of generating the actuation gas pressure is hereinafter referred to as "direct charge detonation method" or "direct method of pressure generation" inside a pin cavity to affect actuation.

The aforementioned actuating pressurized gases may, however, be generated within one or more separate "reservoirs" and then be routed via (e.g., pneumatic) valves to actuate the individual actuating pins upon command. The "reservoir" can accommodate enough pressurized gas to actuate the pins a number of times. This method of generating the pressurized actuation gases for operating the said actuating pins is hereinafter referred to as "indirect charge detonation method" or "indirect method of pressure generation".

The aforementioned direct and indirect methods of generating pressurized gases for the operation of the actuating pins each has certain merits and shortcomings, generally depending on the selected application. The following is a short list of potential advantages and disadvantages of each one of the above methods, particularly for munitions applications.

The following is a number of potential advantages and disadvantages of the aforementioned direct method of pressure generation for the operation of the said actuating pins as compared to the aforementioned indirect method of pressure generation:

For munitions applications or in devices used for emergency use in which the number of steps that the actuator has to move during its entire actuation cycle is rather limited, the direct method of actuation pressure generation is usually more suitable since it would lead to a less complex device and it would occupy less volume. In addition, the resulting actuators do not require actuation valves for their operation.

The direct method has the advantage of not requiring a pressure reservoir, which would occupy certain amount of volume depending on the number of steps is desired to be provided in between "charging" of the reservoir via detonation of individual charges.

The direct method has the advantage of being able to provide very high localized pressure, thereby being capable of providing very high pin actuation forces and as a result, very high actuation forces and torques.

One disadvantage of the direct method is that since the required direction of actuation (to the right or left for linear and clockwise or counterclockwise for rotary actuators) are not known a priori, therefore the pin cavities have to be stacked with a significantly larger number of detonation charges that might be needed to ensure their availability during any operational scenario.

The following is a number of potential advantages and disadvantages of the indirect method of pressure generation for the operation of the said actuating pins as compared to the aforementioned direct method of pressure generation:

The main advantage of the indirect method is that the pressurized gases used to operate the actuating pins are generated in one or more reservoir and then distributed to the acting pin. In this method, the space required to house detonation charges for each individual pin and their initiation devices and wiring are eliminated. Fewer detonation charges providing relatively larger volumes of pressurized gas can be used to power several actuation steps at a time.

The actuator using this method requires pneumatic valves to route the pressurized gases to individual actuating pins. These valves can, however, be one-way pneumatic valves, which can be very simple and very low power to operate.

The potential disadvantage of indirect method is that it may lead to a slightly larger overall volume than direct method based actuation devices. In addition, the actuating gas pressure will generally be lower than those possible with the direct method. However, the additional volume can be minimized by also integrating the reservoir into the structure of the projectile.

Figure 6A:
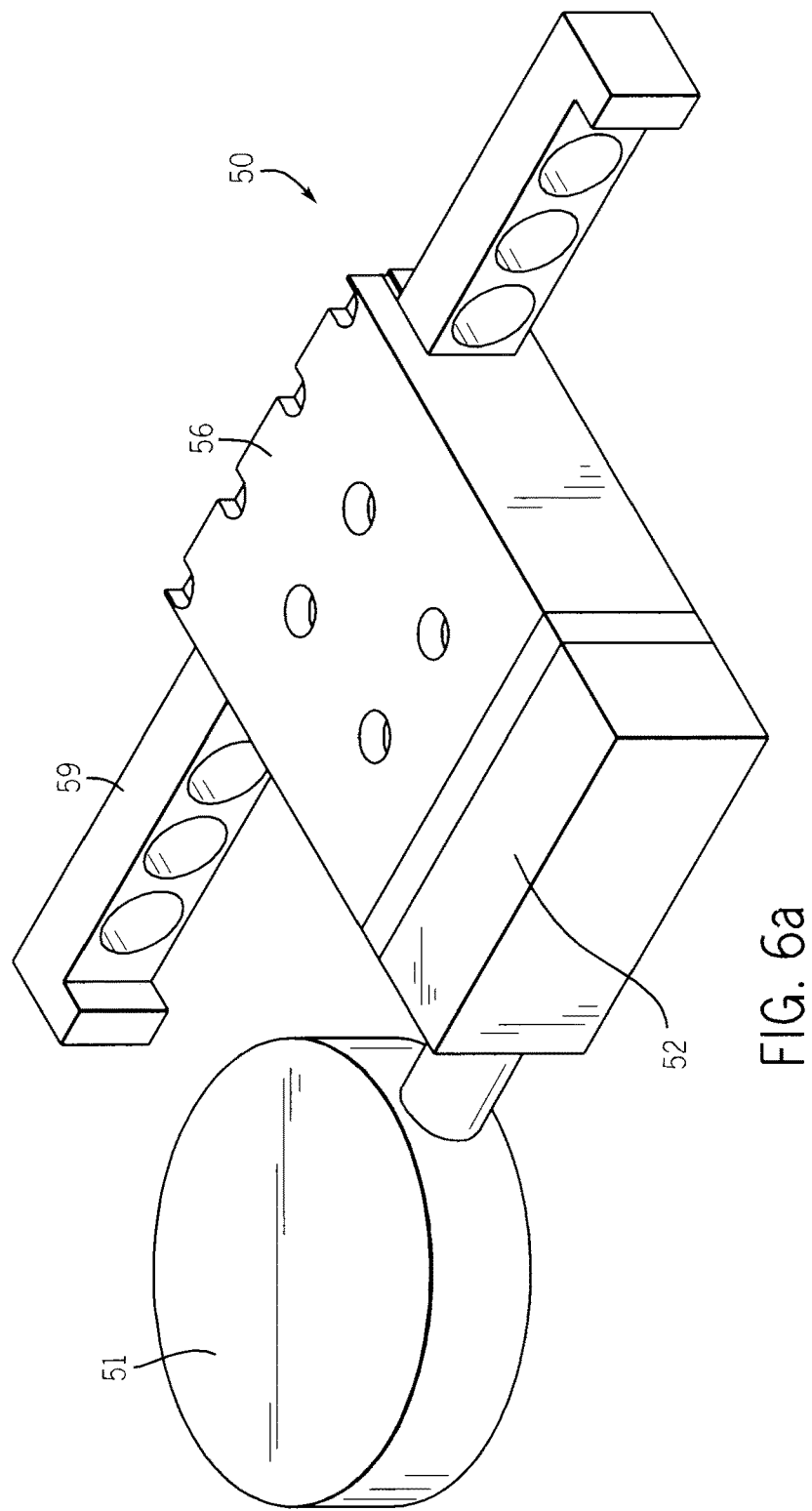
FIG. 6a illustrates an overall view of a linear mechanical stepper motor like actuator with a side combined pressurized gas reservoir and gas generating detonation charge unit.
Figure 6B:
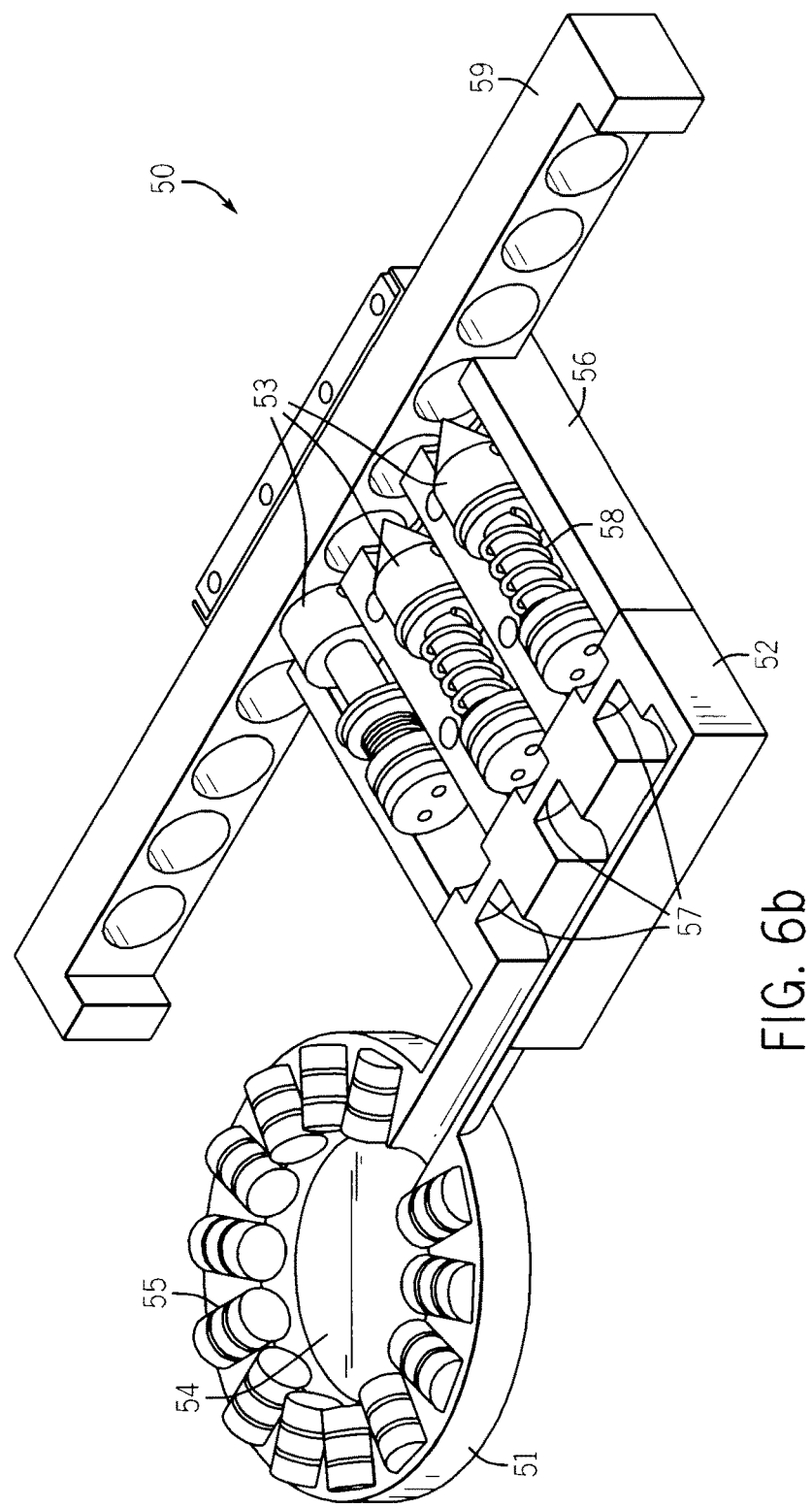
FIG. 6b illustrates a cut-off view of the linear actuator of FIG. 6a showing the pressurized gas chamber and the gas generating charges and other components of the actuator.

FIG. 6a illustrates the overall view of a typical linear actuator embodiment 50 operating based on the aforementioned "indirect charge detonation method" or "indirect method of pressure generation". The cutaway view of the actuator embodiment 50 showing the internal components of the actuator is shown in FIG. 6b. In this embodiment, the actuating pressurized gases are generated within at least one "reservoir" unit 51 and are then routed via control valve unit 52 to actuate the individual actuating pins upon command to the individual actuating pin 53 valves 57 as previously described. The at least one "reservoir" unit 51 can accommodate enough pressurized gas to actuate the actuating pins 53 a number of times.

In the embodiment 50 of FIGS. 6a and 6b, the reservoir unit 51 consists of a pressurized gas reservoir 54 and at least one (single or stack of several individually detonated) pressurized gas generating detonation charges 55 and the shuttle 59. In this embodiment, when the pressure in the gas reservoir 54 drops below a specified level, one of the separate charges 55 (a total of 39 such individual detonation charges are shown in FIG. 6b) is initiated to replenish the reservoir 54. This allows the linear mechanical stepper motor like actuator 50 to operate with much higher efficiency because the constraint of charge allocation in a given cylinder in actuators using the aforementioned direct method of pressurized gas generation, FIGS. 1-5, is removed. Such a design could obviously accommodate significantly larger number of charges and allow a significantly number of actuation steps. Additionally, optimization of the design based on the parameters of reservoir 54 volume, volume occupied by the detonation charges 55, reservoir pressure, and the desired actuating pin 53 operating pressure will yield very high compactness for the device.

The actuating pins 53 may be single acting with tensile return springs 58 as shown in FIG. 6b, or may be double acting as described for the embodiment of FIG. 5b. In either case, by a proper sequence of operation of an actuating pin 53 valve 57, the shuttle 59 may or may not be locked to the body 56 of the actuator 50 as previously described.

In the embodiment 50 shown in FIGS. 6a-6b, the actuator body 56 and the pressurized gas reservoir 54 are can be integral and/or load bearing parts of the projectile structure. The pressurized gas chamber may be positioned as shown in FIGS. 6a and 6b, or positioned in any other position and direction to accommodate the design of the projectile structure.

FIG. 7a illustrates an overall view of another embodiment 60. FIG. 7b shows a cutaway view of the embodiment 60 showing the internal components of the mechanical stepper motor like linear actuation device. The actuator embodiment 60 is similar in construction and operation to the mechanical stepper motor like linear actuator with double acting actuation pins shown in FIG. 5, with the main difference being the positioning and method of storing the actuating detonation charges. The actuator 60 has an actuator body 61 and a shuttle 62 with shuttle pockets 63, FIGS. 7a and 7b. The actuator body 61 is provided with at least one "driving charge" chamber 64 and at least one "return charge" chamber 65 within each of which at least one detonation charge 68 is provided, FIG. 7b.

The linear actuator 60 is constructed with at least three double acting actuating pins 69 (cylinders), with both actions powered by detonation of the indicated charges, one driving charges 68 in at least one chamber 64 to drive the actuation pin 69 to actuate the shuttle 62, and one return charges 68 in at least one chamber 65 to retract the actuating pin 69 away from the shuttle 62 as shown in FIG. 7b. The actuating pins 62 are provided with the piston 67 to allow the pressurize gases generated by charges in the at least one chamber 64 to push the actuating pin 69 forward to engage the shuttle 62 pockets 63 and drive the shuttle 62 to the right or to the left. The actuating pins 62 are also provided with a smaller sized middle portion 71 to allow the formation of a chamber 70, thereby allowing the pressurize gases generated by charges in the at least one chamber 65 to push the actuating pin 69 back to engages the shuttle 62 pockets 63.

It is appreciated by those skilled in the art that the aforementioned "driving charge" and "return charge" chambers may be positioned as shown in FIG. 7b, or be positioned in any other direction to accommodate the design of the projectile structure. Such a design could obviously accommodate significantly larger number of charges for a given length of the actuating pin 66 assembly.

It is appreciated by those familiar with the art that the linear mechanical stepper motor like actuator shown in FIGS. 7a and 7b may also be constructed as a rotary actuator similar to that shown in FIG. 4, and in fact as a mechanical stepper motor like actuator providing an arbitrarily curved motion.

In the embodiments shown in FIGS. 1-5, the gas pressure used to displace the actuation pins were shown to be generated by the detonation of charges that are stacked in the cavity below the actuating pins. In this design, a number of individual charges are packed within the said cavity and detonated on command to generate the required pressure within the cavity to actuate the actuating pin.

In alternative embodiments, the stacked (or individual) charges may be positioned outside the actuation pin chamber as shown for the at least one "driving charge" chamber 64 housing the detonation charges 68 in the embodiment 60 shown in FIG. 7b. The generated pressure is then channeled directly (as shown in FIG. 7b) or through provided passages to actuate the actuating pins. The main advantage of such a detonation charge storage arrangement is that it would allow a significantly larger number of detonation charges to be provided without making the actuation pin assemblies very long.

The embodiments shown in the FIGS. 1-7 are actuated by pressurized gases generated by detonation charges. Such actuation devices are particularly appropriate for applications in gun-fired projectiles, mortars, missiles and other applications in which the actuator is required to operate for a limited and relatively short period of time, and also when very high actuating forces/torques are to be generated by direct detonation of indicated charges.

Figure 8:
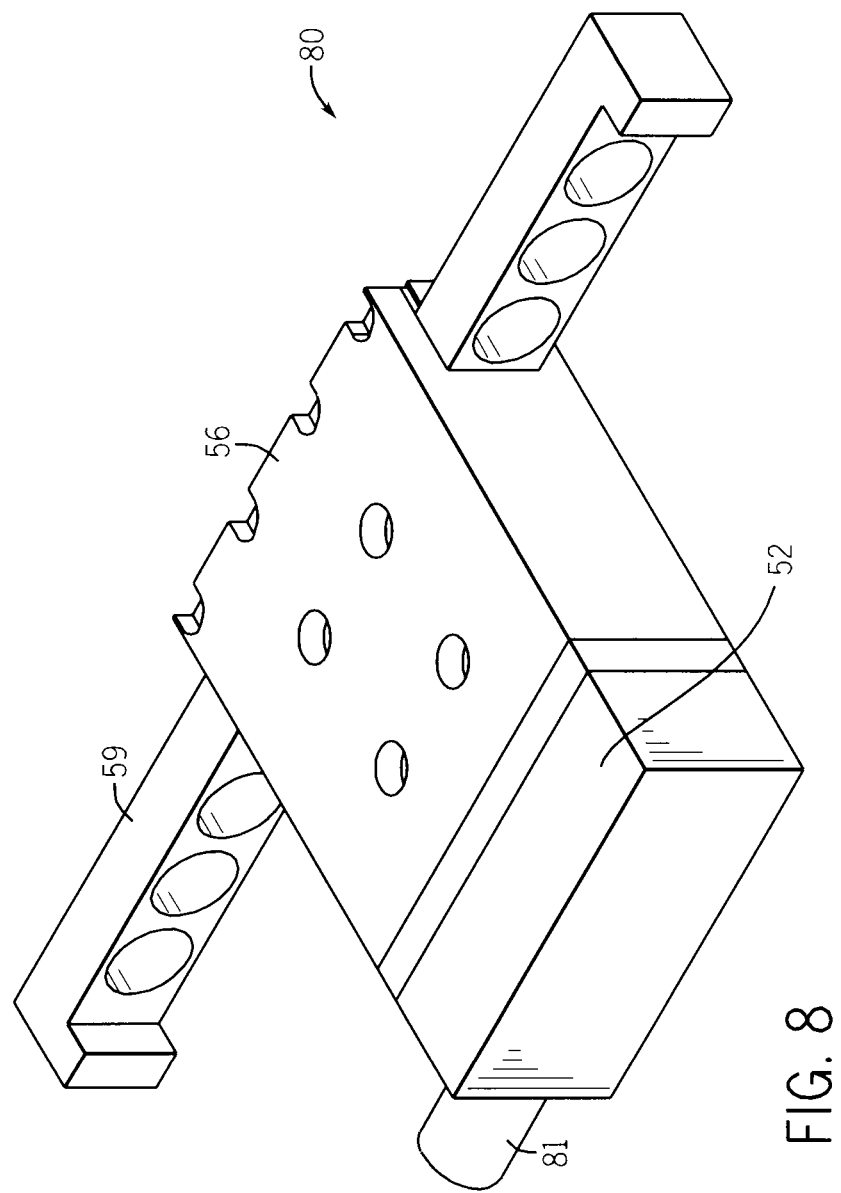
FIG. 8 illustrates an overall view of a pneumatic linear mechanical stepper motor like actuator obtained by replacing the external reservoir unit of the embodiment shown in FIGS. 6a and 6b.

Alternatively, pressurized gas (such as air) or fluid (such as hydraulic fluids) may be provided from external sources and used to drive the disclosed linear and rotary mechanical stepper motor like actuation devices such as those shown in FIGS. 1-7. As an example, the embodiment 50 shown in FIGS. 6a and 6b is redrawn as the linear mechanical stepper motor like actuator 80 in FIG. 8, with the reservoir unit replaced with at a simple pneumatic inlet 81 through which pressurized gas (such as air) is supplied for the actuation of its actuating pins. The remaining components of the actuator embodiment 80 are the same as those of the embodiment 50 shown in FIGS. 6a and 6b. The pressurized gas operating this actuator can be air and can be provided by an external source (not shown). The main advantage of this mechanical stepper motor like actuator is that it could be operated without any number of step limitations.

It is appreciated by those familiar with the art that all the linear and rotary mechanical stepper motor like actuators described in this disclosure, including those shown in FIGS. 1-7, may be similarly designed to operate pneumatically with pressurized air (or other gases). Such pneumatic mechanical stepper motor like actuators are best suited for applications in which they are to be operated for relatively long periods of time. The resulting pneumatic mechanical stepper motors like actuators are more suitable for non-munitions applications, particularly for production type machinery. The resulting pneumatic actuators may be operated as previously described with or without step position locking feature. The mechanical stepper motors described herein can also operate without actuation by pressurized gas (other means for actuation), such as by hydraulic actuation of the pins. Hydraulic activation is well known in the art, such as in hydraulic actuator cylinders.

It is noted that the aforementioned pneumatic linear and rotary mechanical stepper motor like actuators may operate with the aforementioned single-acting (spring return) or double-acting actuation pins. In certain applications, such as when high external dynamic forces are experienced by the actuation device, double-acting actuating pins and/or step position locking features may be required to achieve necessary performance. The additional logic and plumbing for a double-acting and/or step position locking designs is well known in the art, and the overall compactness of the device will not change dramatically.

Figure 9B:
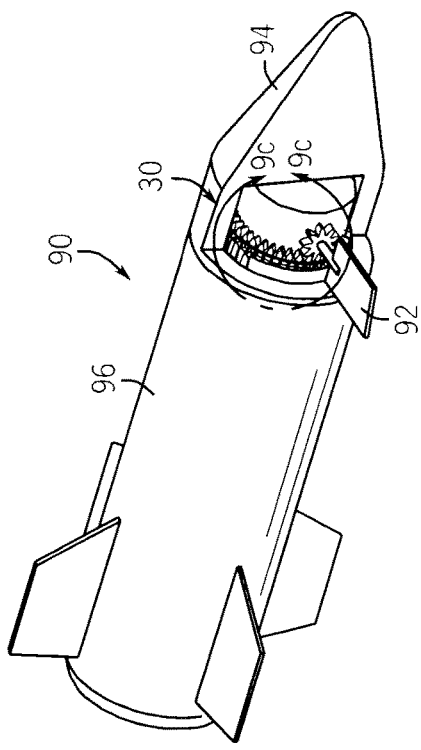
FIG. 9b illustrates the projectile of FIG. 9a having a partial sectional showing the rotary mechanical stepper motor.
Figure 9C:
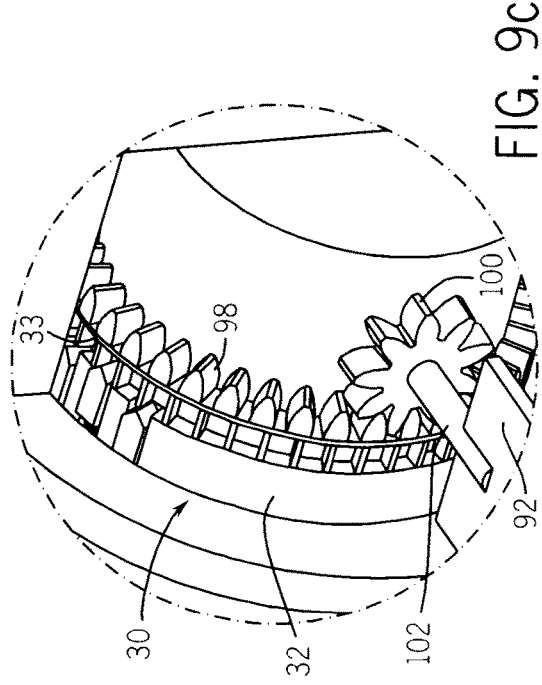
FIG. 9c illustrates an enlarged view of the rotary mechanical stepper motor of FIG. 9b.
Figure 9A:
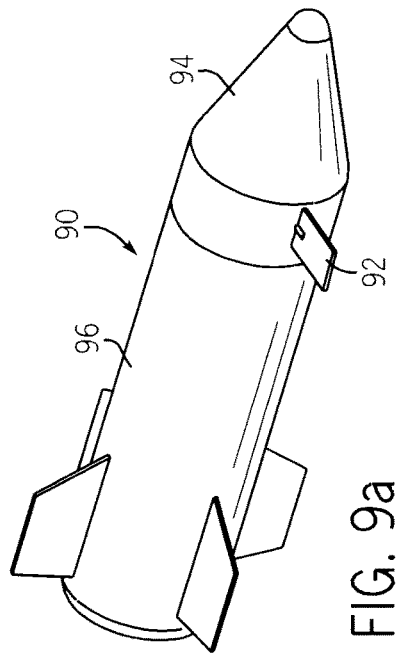
FIG. 9a illustrates a projectile having a canard movable by a rotary mechanical stepper motor.

Referring now to FIGS. 9a-9b, there is shown an exemplary configuration of a mechanical stepper motor integrated into the structure of a projectile 90. In the exemplary configuration of FIGS. 9a-9c, the mechanical stepper motor is of a rotary configuration, such as that shown and described with regard to FIGS. 4a-4c (referred to with reference numeral 30) and the same is used to control a control surface of the projectile 90, which in the exemplary configuration of FIGS. 9a-9c is a canard 92. The guide 32 of the rotary mechanical stepper motor is integrated into one of the nose cone 94 or body 94 of the projectile 90 and the shuttle 33 is allowed to freely rotate within the nose cone 94. A portion of the shuttle 33 carries a geared surface 98 which is provided to mesh with a rotatable gear 100. The canard 92 includes a shaft 102 connected to the gear 100. Thus, rotation of the shuttle 33 in turn rotates the gear 100 which in turn rotates the canard 92 to control the projectile as desired.

Although shown with regard to varying a control angle of a canard 92, the disclosed mechanical stepper motors, linear and/or rotary, can be used to control other features of projectiles, deploy features from projectiles (e.g., wings or other control surfaces) and/or vary an outer surface shape and/or dimension of the projectile (see e.g., U.S. Pat. Nos. 6,727,485; 6,923,123; 6,982,402; 6,935,242 and 7,150,232; the contents of each of which are incorporated herein by reference).

As discussed above, the mechanical stepper motors disclosed herein can be stacked in parallel (e.g., two linear mechanical stepper motors stacked in parallel, one or which for a coarse adjustment and one for a fine adjustment; two linear mechanical stepper motors placed orthogonal to each other to create and X-Y table; three linear mechanical stepper motors each placed orthogonal to another to create an X-Y-Z table; one, two or three linear mechanical stepper motors as described immediately above having a rotary mechanical stepper motor at one or all of the X, Y or Z axes) and/or in series (any combination of linear and/or rotary mechanical stepper motors placed in series so as to customize for any conceivable complex motion).

Although in the embodiments in which the pin is biased, it is biased on the unengaged position, the pin can also be biased in the engaged (locked) position and the charge (or other activation means) can be used to disengage the pins. Furthermore, some pins can be in the normally engaged position and disengaged with a charge (or other activation means) to free the carriage at which point other normally disengaged pins are engaged with a charge (or other activation means) to change the position of the carriage, at which point the normally engaged pins can re-engage (e.g., pressure vented) to lock the carriage in the new position.

The mechanical stepper motors and actuators disclosed herein have widespread commercial use in robotics and automated manufacturing in general and in semiconductor manufacturing in particular. As semiconductor devices become increasing complex and the density of components contained on semiconductors increases, there is an urgent need for precise control of the automated equipment for manufacturing the semiconductor wafers. The proposed novel mechanical stepper motors and actuators can provide such precise control. For example, during the mask-making process of a semiconductor wafer, the mechanical stepper motors and actuators can be used to precisely drive a laser or electron beam to selectively remove chromium and create the mask.

The mechanical stepper motors and actuators disclosed above also have widespread commercial use where sanitary conditions are necessary, such as in the food industry. Because the mechanical stepper motors and actuators disclosed above do not require electrical coils (as do electric stepper motors), they can be washed down to meet FDA standards for certain food manufacturing processes.

The mechanical stepper motors and actuators disclosed herein also have widespread commercial use in emergency situations that may require a large generated force and where a one time use may be tolerated. For Example, the mechanical stepper motors and actuators disclosed above can be configured to pry open a car door after an accident to free a trapped passenger or pry open a locked door during a fire to free a trapped occupant. By using a large explosive force, the novel mechanical stepper motors and actuators disclosed above can generate a very large force and the one time use of the device can be tolerated in emergency situations.

In the mechanical stepper motor type actuator embodiment 10 of FIGS. 1-3, three equally spaced actuating pins 13 are shown to be used. As a result, each (equally spaced) pin 13 actuation advances the shuttle 12 by a distance of D/3. However, if four equally spaced pins 13 are used instead to similarly advance the shuttle the distance D with their sequential actuation, then each one of the actuating pins would advance the shuttle a distance D/4. It is thereby readily observed that an N number of equally spaced pins are used to advance the shuttle a distance d by their similar sequential actuation, then each one of the actuating pins would advance the shuttle a distance of D/N.

Figure 10:
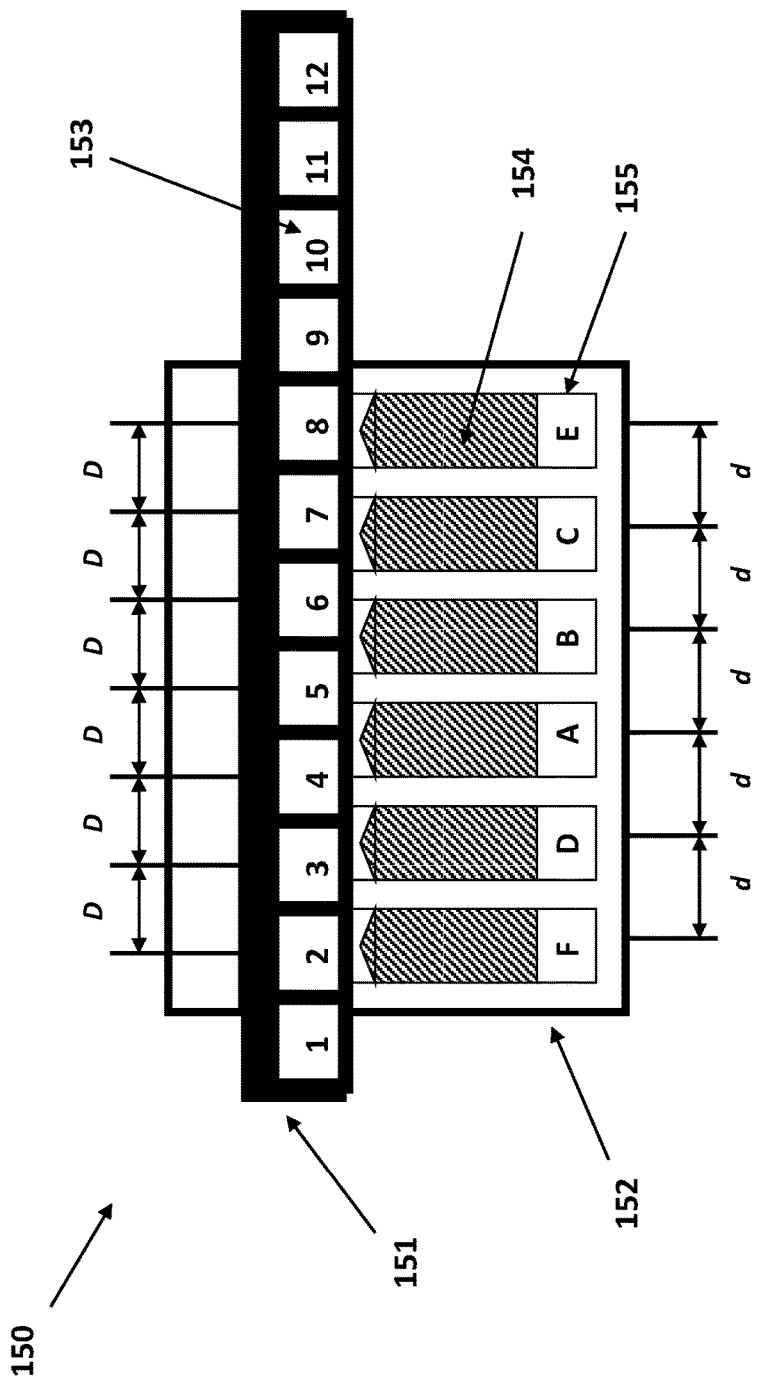
FIG. 10 illustrates an overall view of a modified version of the linear mechanical stepper motor type linear actuator shown in FIGS. 1-3.

For example, consider the linear mechanical stepper motor type actuator 150 of FIG. 10. The actuator 150 is shown to have 6 actuating pins A-F (pins D, E and F in addition to the pins A, B and C of FIGS. 1-3). The shuttle 151 is provided with equally spaced pockets 153 (12 pockets are shown in this illustration, which are numbered sequentially from 1-12), with the distance between the pockets being indicated by D. The basic design of the actuator embodiment 150 is otherwise identical to the design of the embodiment 10 of FIGS. 1-3. The shuttle 151 is provided with a guide (not shown but similar to 20 in the embodiment 10 of FIGS. 1-3) for its linear translation inside the linear motor body 152. Six guides 155 are also equally spaced with their spacing indicated by d for the actuating pin 154. The pins 154 would actuate in a manner similar to the pins 13 of the embodiment 10 of FIGS. 1-3. The actuating pin springs (15 in the embodiment 10 of FIGS. 1-3) are not shown for clarity.

The linear mechanical stepper motor type actuator embodiment 150 is designed such that sequential actuation of the six pins 154 would translate the shuttle 151 one step, i.e., a distance D. For example, in the shuttle configuration shown in FIG. 10 and with the actuating pin F being considered to be lined up with the pocket 2, then by sequentially actuating the pins D, A, B, C, E and then F, the shuttle 151 has been translated one actuating pin spacing d to the right, with actuating pin 154 having the shuttle be advanced to the right a distance d/6.

It was shown above that with the actuating pin F being lined up with the pocket 2 as described above if the next actuating pin D is actuated, the shuttle 151 is advanced a distance D/6 to the right. However, it is appreciated by those skilled in the art that if the next actuating pin A is actuated instead, then the shuttle 151 is advanced twice the distance, i.e., a distance of D/3 to the right.

Similarly, it is readily seen that if five similar actuating pins are equally positioned to advance the shuttle of a present mechanical stepper motor type actuator a distance of D/5 (D still being the spacing of the shuttle pockets) to either right or left, then the shuttle can be advanced either a distance D/5 or a distance 2D/5 with a single actuation of the actuating pin adjacent or the next to the adjacent actuating pin. The shuttle advancement is limited to a distance (step size) of 2D/5 since in general shuttles are desired to be capable of being moved in either direction (right and left in the linear mechanical stepper motor type actuator of FIGS. 1-3 and 10, and in the clockwise and counterclockwise directions in rotary mechanical stepper motor type actuators similar to that of FIG. 4). Similarly, for example if a similar set of 7 actuating pins are used in present mechanical stepper motor type actuators, then similar step sizes of D/7, 2D/7 and 3D/7 can be achieved. As a result, such mechanical stepper motor type actuators are provided with more than one step sizes, i.e., finer and coarser step sizes.

It is therefore appreciated by those skilled in the art that by utilizing the required number of actuating pins and spacing D and appropriate actuating pin spacing d, the designer of the present mechanical stepper motor type linear or rotary actuator can achieve almost any desired step size.

In the above example, the linear mechanical stepper motor type actuator 150 of FIG. 10 was used to illustrate the operation and advantages of using more than 3 actuating pins to achieve smaller step sizes as well as several multiples (i.e., coarser) step sizes. It is also appreciated by those skilled in the art that as was previously described for the embodiment 30 of FIG. 4, the same method can be used to achieve rotary type mechanical stepper motors with the desired (smaller) step sizes as well as several multiples (i.e., coarser) step sizes.

It is also noted that in the embodiments shown in FIGS. 1-8 and 10, the object to be moved relative to a base structure is attached (rigidly or through a certain joint or through contact) to the shuttle (12 in FIGS. 1-3 and 5, 33 in FIG. 4, 59 in FIGS. 6 and 8, 62 in FIGS. 7 and 151 in FIG. 10) while the body (11 in FIGS. 1-3 and 5, 31 in FIG. 4, 56 in FIGS. 6 and 8, 61 in FIGS. 7 and 152 in FIG. 10) is attached to the base structure. This means that as the actuating pins force the shuttles to displace (linearly or rotationally), the shuttles would equally displace (rotate) the object relative to the base structure. This is clearly shown for the linear mechanical stepper motor type actuator 160 (which is similar to the embodiment of FIGS. 1-3) shown in the schematic of FIG. 11. Here the shuttle 161 of the linear actuator 160 is attached to the object 162 by the pin joint 163. The object 162 is free to displace by the actuator 160, riding on wheels 164 on the surface 165 base structure 166. The body 167 of the linear actuator 160 is also attached to the base structure 166. As a result, as the shuttle 161 of the linear actuator 160 is moved to the right or to the left, the object 162 is forced to be displaced the same amount in the same direction.

Figure 11:
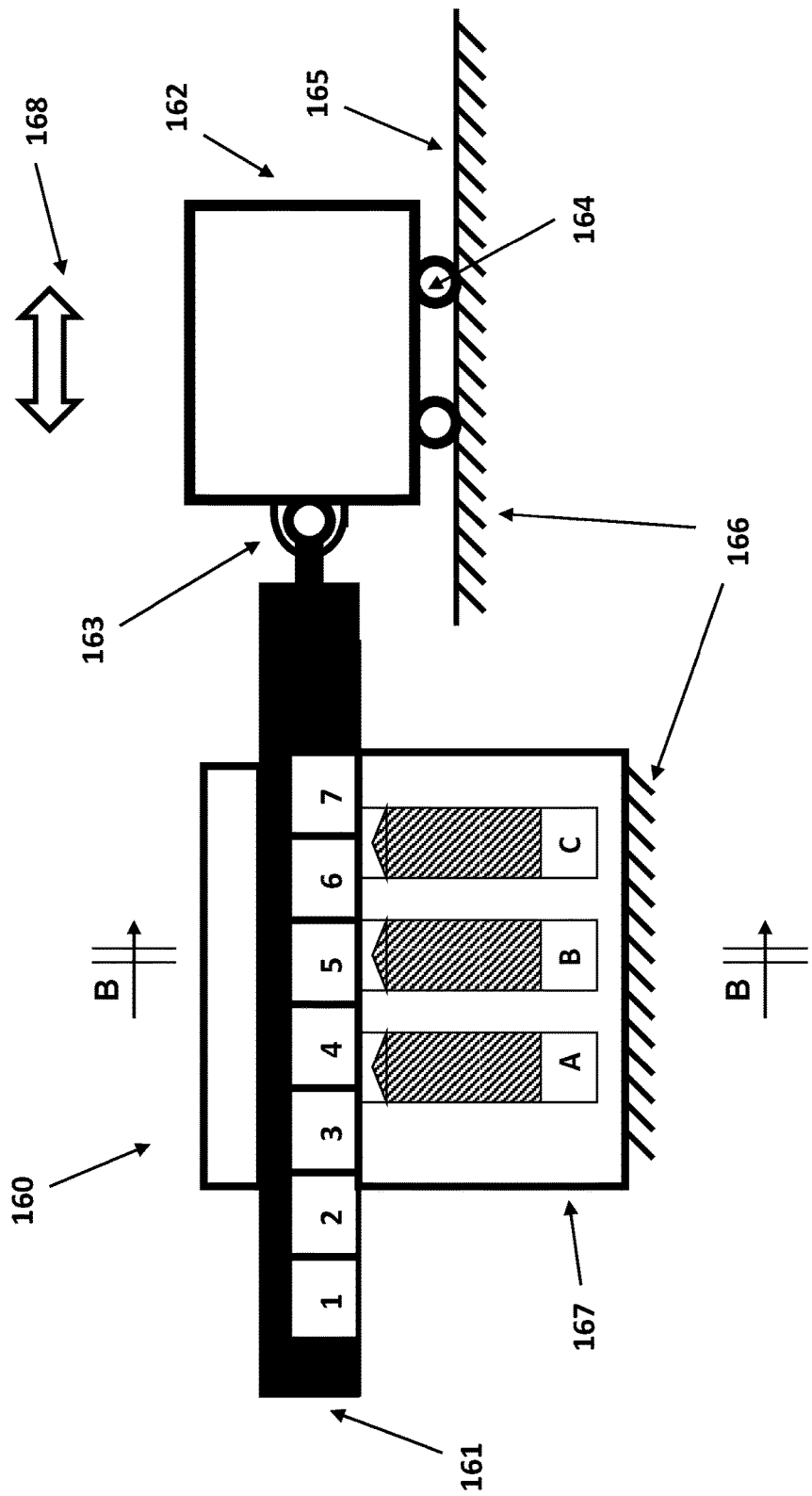
FIG. 11 illustrates the use of a linear mechanical stepper motor type actuator to directly displace object.

In the configuration shown in FIG. 11, the actuation device 160 is intended to displace the object 162, irrespective to the amount of force that is required. Obviously if the amount of resistance to displacement that the object provides is greater than the amount of force that the actuator can provide, then the intended actuator (object) displacement cannot be achieved. Such configurations are critical for achieving displacement precision such as would be needed in fin or canard actuation devices in munitions or indexing tables or machine tools or the like in industrial machinery. In such applications, the resistance to the object motion is designed to be significantly lower than the force (moment or torque) that the actuator can provide.

Figure 12:
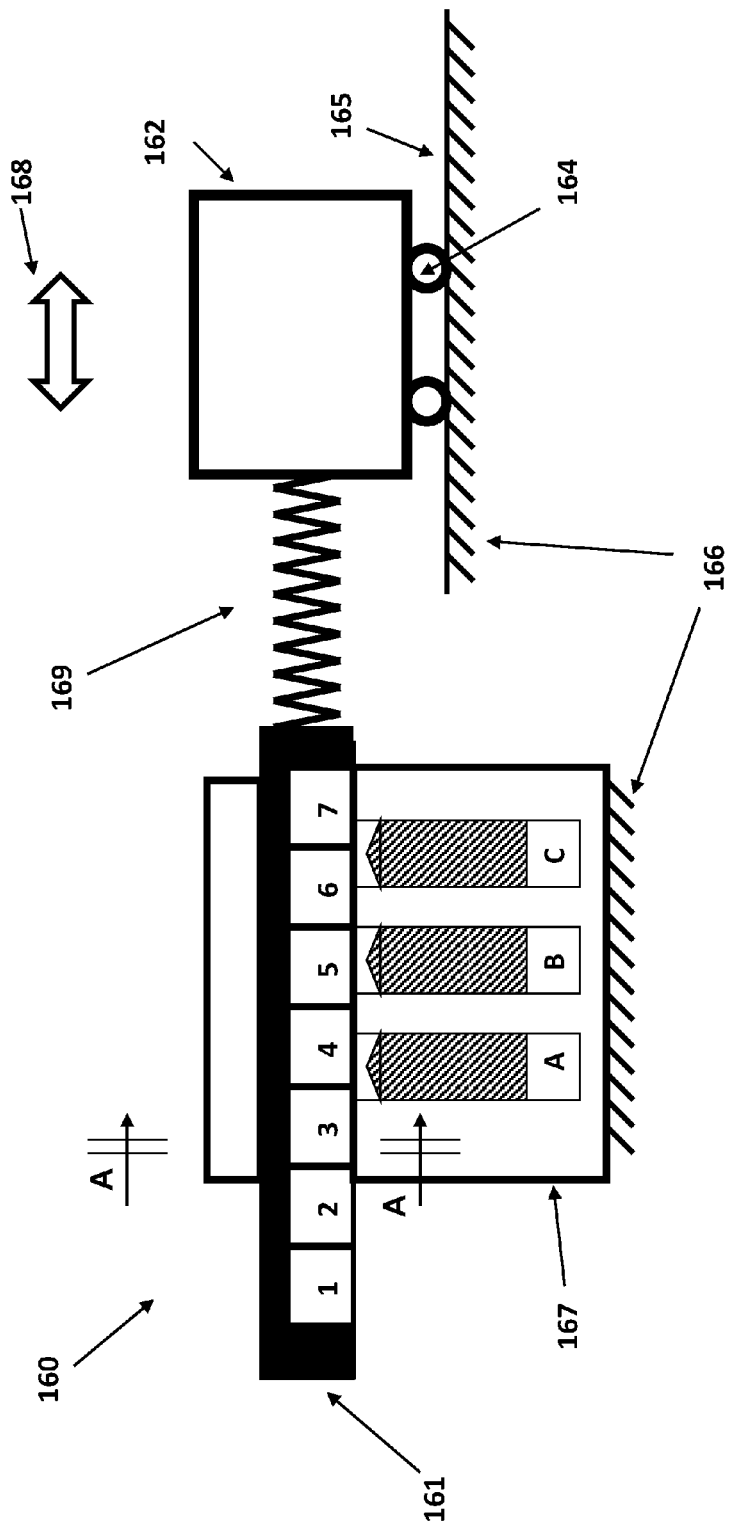
FIG. 12 illustrates the use of a linear mechanical stepper motor type actuator to apply force to an object.

In an alternative configuration shown in FIG. 12, the shuttle 161 is attached to the object 1622 via a relatively flexible element 169 (in this case, a helical spring). As a result, as the shuttle 161 is displaced to the right (or left), the spring element 169 is subjected to a compressive (tensile) force, thereby contracting (extending) the spring 169, thereby causing the spring element 169 to apply a force to the object, thereby tending to push it to the right (left). In this configuration, the actuator 161 would be applying a force to the driven object 169 rather than a displacement as shown in the configuration of FIG. 11. This configuration is appropriate in situations in which the actuator is intended to be used to apply a force to the object irrespective of how far it is displaced, in which case the shuttle 161 is displaced until the object resistance (i.e., the spring deflection) has reached the desired amount or when it is within a desired range. The spring rate of the spring element 169 is selected to match the level of the applied force per shuttle displacement as well as the desired precision with which it needs to be applied to the object. In general, higher force levels demand stiffer springs and smaller shuttle displacements while higher applied force precision demands softer springs and longer shuttle displacements.

It is appreciated by those skilled in the art that in general, when a control system is used in the embodiment 160 configuration, a sensor (position or force sensor or both) is also used to measure the position of the object 162 relative to the structure 165 (or to measure the force acting on the object 162 by the shuttle 161 of the actuator 160) and generate a control signal using a selected control law to determine the number of steps that the shuttle 161 has to be moved.

In the schematic of FIG. 12, the mechanical stepper motor 160 is used to apply force to the object 162. It is appreciated by those skilled in the art that a similar method may be used to apply torque to an object using rotary mechanical stepper motor type actuation devices such as those shown in the schematic of FIG. 4 by providing a torsion spring or the like between the shuttle 33 and the object (shaft or the like) to which a torque is desired to be applied similar to that described for the schematic of FIG. 12.

It is appreciated that linear (rotary) actuators are generally used to apply linear (rotary) motion to an object or device. In the present mechanical stepper motor type actuation devices, depending on the external forces exerted on the actuator shuttle by the driven object or device, it is possible that the shuttle is forced to undergo unwanted motion while an actuating pin is being withdrawn from the shuttle pocket and before the next actuating pin tip has come into contact with the surface of the corresponding shuttle pocket. As a result, the shuttle pockets may be pushed away from their intended alignment with the actuating pins, thereby interfering with the proper motion of the actuation device with the intended sequential actuation of the actuating pins. The following methods may, however, be utilized to ensure proper operation of the actuation device while actuating different devices.

It is appreciated by those skilled in the art that if the object or device resisting force (torque) as a result of the actuator (shuttle) input displacement (rotation) is very low, then a simple friction pad or the like may suffice to ensure that the shuttle would not undergo unwanted motion as the actuating pins are sequentially actuated as previously described and in certain times contact between all actuating pin tips and their corresponding shuttle pocket surfaces is lost. In certain cases, the unavoidable friction forces between the shuttle and the surfaces of the actuator body guide (20 in the embodiments of FIGS. 1-3) may be sufficient for this purpose. Otherwise, when higher or more controlled friction levels are required, at least one friction pad such as the friction pad 170 shown in the cross-sectional view A-A (FIG. 12) shown in the schematic of FIG. 13 may be used. In the cross-section view of FIG. 13, the friction pad 170 is shown to be in contact with a surface of the shuttle 161. A preloaded compressive spring element 171 is provided between the friction pad 170 and the inner surface of the shuttle guide 172 in the actuator body 167. The compressive spring element 171 can be very stiff in the lateral direction so that there is no need for guides or pins or the like (not shown) to prevent lateral displacement (in the direction of the shuttle travel) of the friction pad 170 as the shuttle is forced to displace by the actuating pins or by externally applied forces (toques) by the actuated object or device. The friction pad 170 material and the level of compressive force applied by the spring element 171 are selected such that the required level of friction force can be generated to prevent the aforementioned unwanted movements of the actuator shuttle 161.

On the other hand, if the object or device tend to apply a moderate amount of force (torque) to the actuator shuttle, then the actuator shuttle could undergo unwanted motion as the actuating pins are sequentially actuated as previously described and in certain times contact between all actuating pin tips and their corresponding shuttle pocket surfaces is lost and the actuator functioning could be compromised. To prevent such unwanted motions of the actuator shuttle, the present mechanical stepper motor type actuators may be provided with braking devices. The braking device must obviously be capable of provide enough friction forces to prevent shuttle motion when the shuttle is subjected to maximum possible force (torque).

Figure 14:
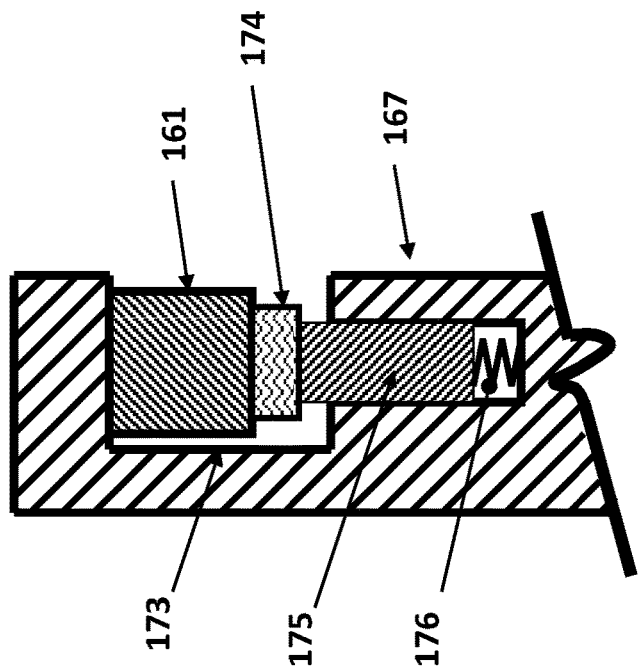
FIG. 14 illustrates method of providing a braking device to prevent unwanted motions of the actuator shuttle as the actuating pins are being actuated.

A basic braking device may be provided in the present linear or rotary mechanical stepper motor type actuators as illustrated in the schematic of FIG. 14. The braking device consists of the braking pad 174, which is moved in position by the piston 175 (similar to the actuating pins 154 in the embodiment of FIG. 10) to press against the shuttle 161. The braking force generated by the piston 175 would also press the shuttle 161 against the top surface of the actuator guide 173 of the actuator body 167, thereby providing added friction forces to resist unwanted shuttle motion. In one configuration of the braking device, the braking piston 175 is provided with a preloaded tensile spring 176, which in normal conditions (when the braking piston is not activated), pulls the piston 175 and the braking pad 174 back and thereby applies no braking force to the actuator shuttle 161. The braking force is then applied to the actuator shuttle by activating the piston 175 upwards by applying pressure or the like to the piston 175 as was previously described for the actuating pins (e.g., actuating pins 154 in the embodiment of FIG. 10).

In another configuration, the spring 176 is a preloaded compressive spring, which in normal conditions (when the braking piston is not activated), pushes piston 175 and the braking pad 174 forward against the actuator shuttle 161, thereby applying a braking force to the actuator shuttle 161 to prevent unwanted motion of the shuttle 161 as the actuating pins (e.g., actuating pins 154 in the embodiment of FIG. 10) are being actuated. The braking pad 174 is then retracted by activating the piston 175, in this configuration, by pulling the piston 175 downward as was previously described for the actuating pins (e.g., actuating pins 154 in the embodiment of FIG. 10).

Alternatively, no spring element 176 may be provided and double acting pistons such as those previously described for the actuating pins (e.g., actuating pins 154 in the embodiment of FIG. 10) may be used to deploy or retract the braking pad via actuation of a double acting piston 175.

It is appreciated by those skilled in the art that more than one friction pad (FIG. 13) or braking device (FIG. 14) may be used in the present mechanical stepper motor type actuation devices. In general, the main advantages of using more than one friction pad and/or braking device include the fact the friction forces are distributed more uniformly and evenly between the shuttle surface and the contacting actuator body within the shuttle guide. In addition, the required friction/braking forces can be distributed over a number of friction pads and braking elements. This is particularly desirable when the shuttle length within the actuator body guide is relatively long, such as can be seen to be the case for the rotary mechanical stepper motor type actuator embodiment of FIG. 4.

It is appreciated by those skilled in the art that if the object or device being displaced (linearly or rotationally actuated) applies a significant amount of force (torque) to the actuator shuttle, particularly if such forces (torques) could be sustainable over a significant range of reactive motion of the shuttle, then the aforementioned friction pads (FIG. 13) or braking mechanisms (FIG. 14) may not be sufficient to resist such high levels of forces (torques). It is noted that such motions are considered to be significant if they interfere with proper operation of the actuator by causing the shuttle to be displaced enough so that the proper sequential actuation of the actuating pins is affected, for example a distance D/3 for the mechanical stepper motor type actuator embodiment of FIG. 1-3, 11 or 12.

In the braking device embodiment of FIG. 14, at least one separate piston similar to the actuating pins (e.g., actuating pins 154 in the embodiment of FIG. 10) is used to deploy or retract the braking pad 174 from engagement with the actuator shuttle 161. In an alternative embodiment, the braking device may instead be designed to be operated by the actuator actuating pins themselves. In such an embodiment, the actuation of any one of the actuating pins must operate the braking device (i.e., release the brake as the actuating pin comes in contact with the surface of the shuttle pocket so that it can resist the externally applied shuttle forces to prevent or minimize unwanted shuttle movements). Numerous mechanisms may be used in the design of such actuating pin operated brake devices, an example of which is provided in the following.

Figure 15:
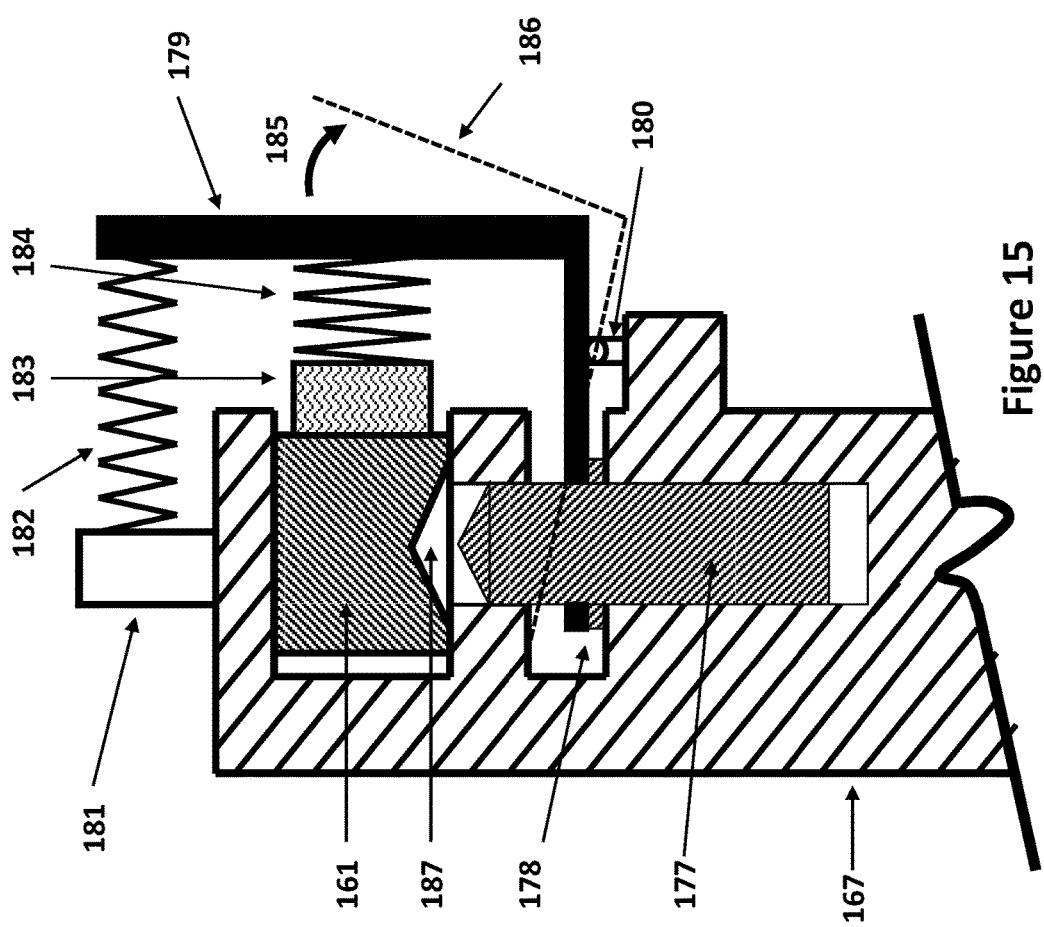
FIG. 15 illustrates an example of an actuating pin operated normally engaged braking mechanism to prevent unwanted motions of the actuator shuttle as the actuating pins are being actuated.

The braking pad of such actuating pin operated braking devices are intended to be braking the actuator shuttle at all times (hereinafter referred to as in normal conditions), while all actuating pins are retracted, i.e., are not engaged with the shuttle pockets. The basic operation of the indicated actuating pin operated braking device mechanisms is to release the braking pad (similar to the braking pad 174 in the schematic of FIG. 14) once any one of the actuating pins is actuated, at or close to the point that the tip surface of the actuating pin comes in contact with the corresponding shuttle pocket surface so that to allow minimal motion of the shuttle due to externally applied forces. An example of such a basic actuating pin actuated braking mechanism is shown in the schematic of FIG. 15. The schematic of FIG. 15 illustrates a cross-sectional side view of a mechanical stepper motor type actuator embodiment, such as the cross-section B-B through one of the actuating pins of the embodiment of FIG. 11. The actuating pin 177 is shown to be provided with a flange 178, over which the link 179 of the braking device mechanism rests (such as, through slotted opening to accommodate the actuating pins 177) in normal conditions, i.e., while the actuating pin is in its retracted position as shown in FIG. 15. The link 179 of the braking mechanism is similarly engaged with similar flanges 178 of all the actuating pins 177 of the mechanical stepper motor type actuator. The link 179 of the braking device mechanism is attached to the actuator body 167 by the rotating joint 180. The link 179 is also attached to the structure of the actuator body at a provided attachment point 181 via at least one spring 182, which is preloaded in tension such as the brake pad 183 is in the aforementioned normal conditions is pressed against the shuttle 161 of the actuator. A compressively preloaded spring 184 can also be positioned between the link 179 of the braking device mechanism and the brake pad to keep a minimal braking (friction force) on the shuttle at all times as is described below even when the braking device is in a retracted position.

The braking device mechanism illustrated in the schematic of FIG. 15 allows the actuation of any one of the actuating pins 177 to cause the link 179 to be rotated in the clockwise direction as shown by the arrow 185 to the position shown by the broken lines and indicated by the numeral 186. It is noted that as an actuating pin 177 begins to be pushed up to engage the corresponding shuttle pocket (187 in the schematic of FIG. 15), the flange 178 of the actuating pin would begin pushing the engaging end of the link 179 up, thereby beginning to rotate the link 179 clockwise in the direction of the arrow 185 about the joint 180, thereby beginning to relieve pressure on the brake pad spring 184. In general, the amount of clockwise rotation of the link 179 that is reached when the actuating pin 177 is fully engaged with the shuttle pocket 187 is selected such that a prescribed minimum force is still being exerted by the spring 184 on the braking pad 183 so that a desired level of friction force is still applied to the shuttle 161 to prevent it from undergoing unwanted motions. It is, however, appreciated by those skilled in the art that if such minimal braking friction forces are not required, the braking pad 183 can be pulled out of contact with the shuttle 161 to minimize wear of either surfaces.

It is appreciate by those skilled in the art that the actuating pin operated brake actuation mechanism shown in the schematic of FIG. 15 is provided mainly to illustrate the mechanism of operation of such shuttle braking systems and that numerous other mechanisms known in the art may also be used for this purpose.

It is also appreciated by those skilled in the art that in the embodiment of FIG. 15, the braking mechanism is operated by the clockwise rotation of the link 179. As a result, every one of the actuating pins 177 are required to be engaged with link 179 as shown in FIG. 15 to be able to disengage the brake as they move up to engage the corresponding shuttle pocket 187. In an alternative embodiment, a separate brake actuating piston or the like is provided which is actuated to relieve the braking force (completely or to a minimal level as was previously discussed for the embodiment of FIG. 15) as the actuating pin 177 engages a pocket 187 of the shuttle. Such a braking system is similar in operation to that of embodiment of FIG. 14 with the difference that a linkage mechanism such as the link 179 is actuated by the piston 175 (FIG. 14), thereby gaining the advantage of, for example, reducing the size of the piston 175 by using the mechanical advantage that is gained by the use of the link 179.

Figure 13:
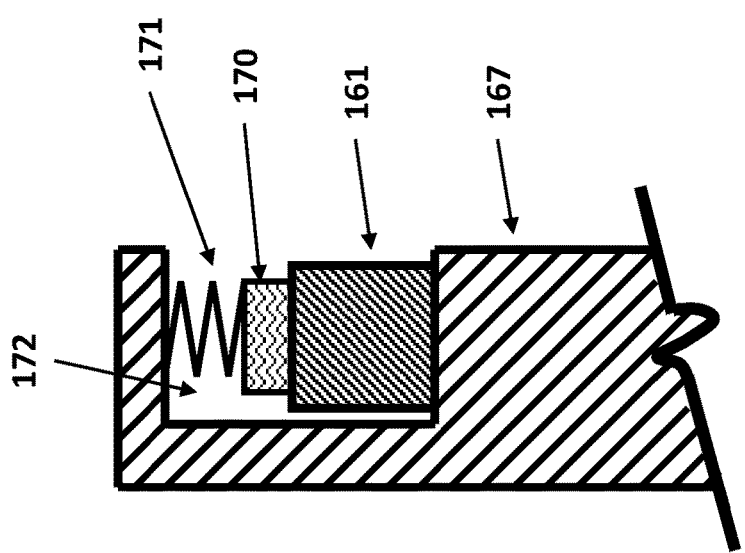
FIG. 13 illustrates a method of providing a continuous but relatively low level of friction force to the actuator shuttle to prevent its unwanted motion as the actuating pins are being actuated.

In the embodiments of FIGS. 13-15, unwanted motion of the actuator shuttle is prevented or minimized by friction force through barking pads (elements 170, 174 and 183 in FIGS. 13, 14 and 15, respectively) or other friction generating elements. In certain applications, particularly when the shuttle is subjected to relatively large and in certain case shock loading, it is preferred that the unwanted motion of the shuttle be controlled by positive mechanical locking mechanisms rather than the friction forces that may allow slippage, thereby a certain amount of unwanted shuttle motion as the actuating pins are being actuated.

One such method of providing such positive mechanical locking mechanism was previously described for the embodiment 40 of FIGS. 5a and 5b, in which the actuating pin 41 is provided with a straight portion 46 (cylindrical if the pin is cylindrical) so that when actuated, the straight portion 46 fits inside the matching shuttle pockets 47, thereby locking the shuttle 12 to the actuator body 11. The one actuated pin 41 is then retracted only following the actuation of the next actuating pin and it comes in contact with the surface of the corresponding shuttle pocket 47, thereby minimizing unwanted motion of the shuttle 12 relative to the actuator body 11.

Figure 16:
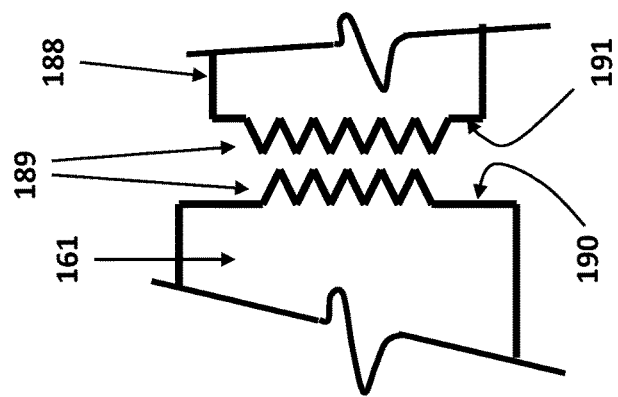
FIG. 16 illustrates an example of shuttle motion preventing element that operates based on providing a positive mechanical locking mechanisms between the locking element and the shuttle surface.

Similar positive mechanical locking mechanisms may also be achieved by replacing the braking/friction pads 174 or 183 in FIGS. 14 and 15, respectively, with certain teethed elements that would engage mating surfaces provided on the surface of the shuttle 161 upon activation of the resulting positive mechanical locking mechanisms, i.e., by the actuation of the piston 175 in the embodiment of the FIG. 14 and the retraction of all actuating pins 177 in the embodiment of FIG. 15. Such engaging mating surfaces are well known in the art. For example, the engaging mating surfaces for the embodiment of FIG. 14 may be constructed as fine and near triangular teeth 189, which are provided on the (frontal) surface 190 of the shuttle 161 and the surface 191 of the mating element 188 (replacing the brake pad 183 in the embodiment of FIG. 14), shown in the schematic of FIG. 16. It is, however, appreciated by those skilled in the art that the teeth 189 must be fine enough such that at no times when the described positive mechanical locking mechanism is actuated to engage the mating teeth 189, the shuttle is at most displaced an acceptable (small) distance, generally a small fraction of the amount of advancement of the shuttle 161 during each sequential actuation of the actuating pins, so that the actuator can achieve its desired step-wise positioning precision.

In an alternative embodiment, at least one position sensor is used to indicate the actual position of the shuttle relative to the actuator body. Such sensors for linear as well as rotary actuators (motors) are well known in the art and may be an optical encoder type, a potentiometer type or of any other available type. By using the indicated position sensor, the position of the shuttle relative to the actuator body is known at all times to the actuator controller. As a result, even if the shuttle has undergone certain amount of unwanted motion relative to the actuator body due to the externally applied forces or the like, the controller could still perform an appropriate sequence of actuating pin actuation to achieve proper operation of the system or device that is being driven by the present mechanical stepper motor type actuation device.

In all the above mechanical stepper motor type actuation devices, the tips of many of the actuating pins were shown to be mostly conical (e.g., in the embodiments of FIGS. 6, 7 and 15). In fact, from manufacturing point of view, the actuating pins can be made cylindrical with conic tips and conical shuttle pockets. The engaging surfaces of the actuating pin tip and the shuttle pockets may, however, be shaped such that as the two surfaces come into contact and the actuating pin is pushed into the shuttle pocket to advance the shuttle back or forth relative to the actuator body, a prescribed rate of shuttle advancement with respect to the actuating pin advancement into the shuttle pocket is achieved. In general, the rate can be selected such that the shuttle motion is smooth throughout the actuating pin motion. Such prescribed motions can be designed to match the requirements of the operation of the mechanical stepper motor type actuator specific to the driven machine or device. Methods of designing such curved surfaces to achieve prescribed motions during actuating pin actuation are well known in the art and are similar to those that have been developed for the design of cam and follower surfaces.

Figure 17:
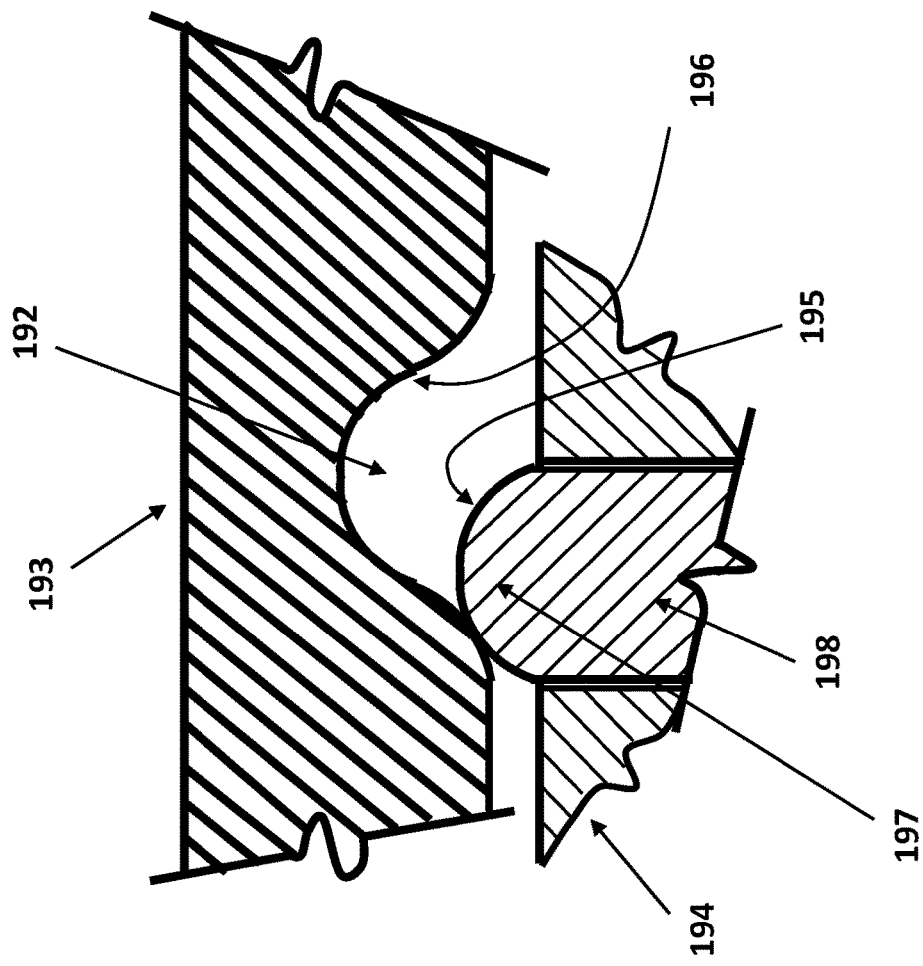
FIG. 17 illustrates an example of the method of providing properly shaped (cam-like) surfaces on the tip surfaces of the actuating pin and the shuttle pocket to achieve a prescribed rate of shuttle advancement per actuating pin advance into the shuttle pocket.

An example of such actuating pin tip and shuttle pocket curved surfaces designed to achieve smooth start and stop profile of the shuttle is shown in the schematic of FIG. 17.

As can be seen in FIG. 17, the surface 196 of the pocket 192 provided in the shuttle 193 and the surface 195 of the tip 197 of the actuating pin 198 (which rides in the guide provided in the actuator body 194) are designed such that with a constant rate of actuating pin tip 197 advancement into the shuttle pocket 192, the shuttle 193 begins to move (to the left relative to the actuator body 194) slowly at first, then faster and again slowly at the end. As a result, a smooth shuttle 193 motion is achieved. It is also appreciated by those skilled in the art that for a constant actuating pin force, the force that can be applied to the shuttle 193 is initially larger (due to the mechanical advantage provided by the mating curved surfaces), becoming smaller and again becoming larger as the actuating pin tip 197 comes to a stop against the surface 196 of the shuttle pocket 192. It is also appreciated by those skilled in the art that the changes in the mechanical advantage in the transmission of actuator pin force to the actuator shuttle can be used to design the actuating pin tip and shuttle pocket surfaces such that a prescribed force transmission characteristic is achieved.

It is also appreciated by those skilled in the art that in a single mechanical stepper motor type actuator, different shuttle pockets (and even different actuating pin tips) may have different curved surface shapes. Such capability is particularly advantageous in applications in which the mechanical stepper motor is desired to provide significantly higher output force/torque or advance faster or slower, etc., in one range of its motion and another in another range of its motion.

It is also appreciated by those skilled in the art that if the aforementioned prescribed curved surfaces of the actuating pin tip and the shuttle pocket are not symmetrical about the long axis of the cylindrical actuating tip (once fully engaged), then the actuating pins must be prevented from rotation about their long axis. This can be accomplished by providing certain external guides (e.g., by providing a sliding pin that is attached rigidly to an exposed portion of the actuating pin and rides in a provided parallel guide—similar to those regularly used in pneumatic pistons when rotational restriction is desired). However, the actuating pin can be made with elliptical cross-section, which makes it readily sealed in the actuating pin bore, for example by o-rings or the like, while being prevented from free rotation. The actuating pin may also be made with oval cross-section to accommodate the available actuator shape and volume. It is also appreciated that with currently available CNC machinery, such oval pins and bored housings can be readily manufactured.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A projectile comprising:
a body having an internal space; and
a mechanical stepper motor disposed in the body, the mechanical stepper motor comprising:
a shuttle having one of a plurality of pockets and movable pins offset from each other with a first spacing;
a body portion having the other of the plurality of pockets and movable pins offset from each other with a second spacing, where the first spacing is different from the second spacing; and
actuation means for engaging at least one of the movable pins into a corresponding pocket to step one of the shuttle and body portion a predetermined linear and/or rotary displacement;
wherein the mechanical stepper motor outputs the predetermined linear and/or rotary displacement to an actuated device operatively connected to the shuttle.

2. The projectile of claim 1, further comprising locking means for locking a position of one of the shuttle and body relative to the other.

3. The projectile of claim 2, wherein the locking means comprises means for maintaining one or more of the movable pins in a corresponding pocket after activation thereof.

4. The projectile of claim 2, wherein the means for maintaining one or more of the movable pins in a corresponding pocket after activation thereof further comprises means for removing the one or more of the movable pins from the corresponding pocket prior to a subsequent activation of another of the movable pins.

5. The projectile of claim 2, wherein the locking means comprises one or more friction pads normally biased against a surface of the shuttle.

6. The projectile of claim 2, wherein the locking means comprises one or more braking pads selectively biased against a surface of the shuttle by an actuator.

7. The projectile of claim 6, further comprising a biasing member for further normally biasing the one or more braking pads against the surface of the shuttle.

8. The projectile of claim 2, wherein the activation of the movable pins disengages the locking means upon movement of the movable pins into a corresponding pocket and engages the locking means upon withdrawal of the movable pins from the corresponding pocket.

9. The projectile of claim 2, wherein one or more of the movable pins and pockets have a profile to vary one of a force, torque or displacement profile during activation of the movable pin into a corresponding pocket.

10. A projectile comprising:
a body having an internal space; and
a mechanical stepper motor disposed in the body, the mechanical stepper motor comprising:
  a shuttle having one of a plurality of pockets and movable pins offset from each other with a first spacing;
  a body portion having the other of the plurality of pockets and movable pins offset from each other with a second spacing, where the first spacing is different from the second spacing; and
  actuation means for engaging at least one of the movable pins into a corresponding pocket to step one of the shuttle and body portion a predetermined linear and/or rotary displacement;
wherein the mechanical stepper motor applies one of a force or torque to an actuated device operatively connected to the shuttle.

11. The projectile of claim 10, further comprising an elastic element connected between the shuttle and the actuated device to apply the one of force or torque to the actuated device.

12. A mechanical stepper motor comprising:
a shuttle having one of a plurality of pockets and movable pins offset from each other with a first spacing;
a body portion having the other of the plurality of pockets and movable pins offset from each other with a second spacing, where the first spacing is different from the second spacing; and
  actuation means for engaging at least one of the movable pins into a corresponding pocket to step one of the shuttle and body portion a predetermined linear and/or rotary displacement;
wherein the mechanical stepper motor outputs the predetermined linear and/or rotary displacement to an actuated device operatively connected to the shuttle.

13. The mechanical stepper motor of claim 12, further comprising locking means for locking a position of one of the shuttle and body relative to the other.

14. The mechanical stepper motor of claim 13, wherein the locking means comprises means for maintaining one or more of the movable pins in a corresponding pocket after activation thereof.

15. The mechanical stepper motor of claim 14, wherein the means for maintaining one or more of the movable pins in a corresponding pocket after activation thereof further comprises means for removing the one or more of the movable pins from the corresponding pocket prior to a subsequent activation of another of the movable pins.

16. The mechanical stepper motor of claim 13, wherein the locking means comprises one or more friction pads normally biased against a surface of the shuttle.

17. The mechanical stepper motor of claim 13, wherein the locking means comprises one or more braking pads selectively biased against a surface of the shuttle by an actuator.

18. The mechanical stepper motor of claim 17, further comprising a biasing member for further normally biasing the one or more braking pads against the surface of the shuttle.

19. The mechanical stepper motor of claim 12, wherein the activation of the movable pins disengages the locking means upon movement of the movable pins into a corresponding pocket and engages the locking means upon withdrawal of the movable pins from the corresponding pocket.

20. The mechanical stepper motor of claim 12, wherein one or more of the movable pins and pockets have a profile to vary one of a force, torque or displacement profile during activation of the movable pin into a corresponding pocket.

21. A mechanical stepper motor comprising:
a shuttle having one of a plurality of pockets and movable pins offset from each other with a first spacing;
  a body portion having the other of the plurality of pockets and movable pins offset from each other with a second spacing, where the first spacing is different from the second spacing; and
  actuation means for engaging at least one of the movable pins into a corresponding pocket to step one of the shuttle and body portion a predetermined linear and/or rotary displacement;
wherein the mechanical stepper motor applies one of a force or torque to an actuated device operatively connected to the shuttle.

22. The mechanical stepper motor of claim 21, further comprising an elastic element connected between the shuttle and the actuated device to apply the one of force or torque to the actuated device.

* * * * *